United States Patent
Radjy et al.

(10) Patent No.: US 6,687,559 B2
(45) Date of Patent: Feb. 3, 2004

(54) APPARATUS AND METHOD FOR A VERTICALLY INTEGRATED CONSTRUCTION BUSINESS

(75) Inventors: Farro F. Radjy, Pittsburgh, PA (US); David J. Szpanka, McKeesport, PA (US); Timothy S. Roth, Greensburg, PA (US)

(73) Assignee: Digital Site Systems, Inc., Pittsburgh, PA (US)

( * ) Notice: Subject to any disclaimer, the term of this patent is extended or adjusted under 35 U.S.C. 154(b) by 100 days.

(21) Appl. No.: 09/826,407

(22) Filed: Apr. 4, 2001

(65) Prior Publication Data

US 2002/0010525 A1 Jan. 24, 2002

Related U.S. Application Data

(60) Provisional application No. 60/194,468, filed on Apr. 4, 2000.

(51) Int. Cl.[7] .............................................. G06F 19/00
(52) U.S. Cl. ..................................... 700/106; 700/117
(58) Field of Search ............................ 700/95–97, 99, 700/106, 107, 117, 265; 705/8, 26, 29

(56) References Cited

U.S. PATENT DOCUMENTS

| | | | | |
|---|---|---|---|---|
| 5,333,969 A | | 8/1994 | Blaha et al. ................... | 404/91 |
| 5,552,995 A | * | 9/1996 | Sebastian ...................... | 700/97 |
| 5,943,234 A | | 8/1999 | Martinez et al. .............. | 700/97 |
| 5,983,165 A | | 11/1999 | Minnich et al. ............... | 702/56 |
| 6,064,982 A | * | 5/2000 | Puri ............................. | 705/27 |
| 6,186,654 B1 | | 2/2001 | Gunteret, Jr. et al. .......... | 366/18 |
| 6,223,094 B1 | * | 4/2001 | Muehleck et al. ........... | 700/107 |
| 6,343,285 B1 | * | 1/2002 | Tanaka et al. ............... | 705/400 |

FOREIGN PATENT DOCUMENTS

| | | |
|---|---|---|
| WO | WO 95/35415 | 12/1995 |
| WO | WO 99/30265 | 6/1999 |
| WO | WO 00/16210 | 3/2000 |

OTHER PUBLICATIONS

Black, T., "Paving the Road to the 21$^{st}$ Century", American City & County, Nov. 1997, vol. 12, No. 12, pp 44–49.
Black, T., "Warming Up to Technology", American City & Country, Apr. 1998, vol. 113, No. 4, pp 64–79.
Black, T., "Paving the Road to the 21$^{st}$ Century", American City & County, Nov. 1997, vol. 12, No. 12, pp 44(7).
Malloy, C., "EPA Cites Recovery Potential in Flowable Fill", Concrete Products, Nov. 1998, vol. 101, No. 11, pp 61–62.

* cited by examiner

Primary Examiner—Leo Picard
Assistant Examiner—Ryan Jarrett
(74) Attorney, Agent, or Firm—Reed Smith LLP

(57) ABSTRACT

A system and method for a vertically integrated construction business. More specifically, a system and method for employing the World Wide Web in a business that vertically integrates the concrete materials procurement, specification, submittals, quotation, testing for compliance with specifications, automated mixture optimization, and manufacturing processes in the construction industries. A relational database is provided with linked objects to create both standards-based and manufacturer-based specifications for concrete and concrete constituent materials. Concrete recipes utilizing the defined specifications are developed either prescriptively or performance-based. Standards-based basemixes that specify concrete can be instantiated into production mixes using local materials. All of the data is preferably published in XML format over the Internet, providing real-time feedback to concrete batch plants and specifiers.

18 Claims, 23 Drawing Sheets

| |
|---|
| Example: Compressive strength as a function of age in days measured on 6 x 12" cylinders per ASTM C39. This test prop item is composited from three test elements. <br> • QP = strength; continuous; dependent —180 <br> • QP = Age (1,3,7,14,28days, etc.); continuous; independent —182 <br> • QP = specimen type (2x4,4x8,6x12 cylinders, 2" cube, beam, etc); discrete, independent |

| Example: Portland Cement by ASTM C150. Over 30 independent quantifiable properties, 8 formal types, and 75 generic optional types; 18 Test Methods. Below: Two QP's illustrated for Portland Cement Type I: ||||||
|---|---|---|---|---|---|
| Spec Property Group | Dependent Quantifiable Property | Standard Test | Set Independent QP | Set constraints | 216 |
| Physical | Strength | C109 | Age = 3 days | > 1740 psi | 218 |
| Chemical | MgO | C114 | na | < 6% | |

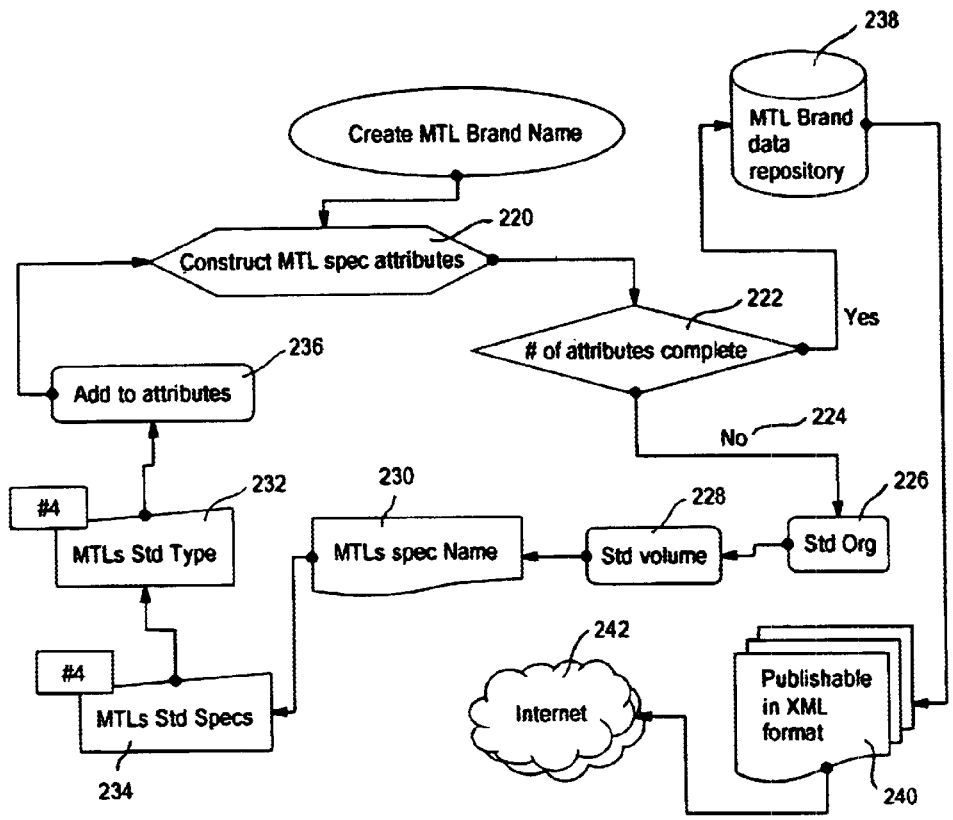

FIG. 5A

| Example: Create a cement with the brand name Continental 1A2 which has two sets of spec attributes: | | | | | |
|---|---|---|---|---|---|
| Attribute # | STD ORG | STD VOL | MTL SPEC Name | MTL STD Type | 244 |
| 1 | ASTM | 4.01 | C150 | I | |
| 2 | AASHTO | Part II | M85 | II | 246 |

Note that standard cements ASTM Type I and AASHTO Type II are created under the process in Slide #4. Thus the Brand Continental 1A2 automatically knows who it is in terms of *object specs* and the *verification process for compliance*.

FIG. 5B

| Spec Property Group | Dependent Quantifiable Property | Standard Test | Set Independent QP | Set Constraints | Evaluation Method |
|---|---|---|---|---|---|
| Hardened | Strength | C39 | Age = 28 Days | > 3000 | ACI 318 |
| Plastic | Slump | C143 | na | 4" to 8" | One Standard Deviation |
| Plastic | Air Content | C173 | na | 5% +- 1 | One Standard Deviation |

FIG. 10A

| Variable Type | Material or Material Quantifiable Property (MQP) | MTL Attributes | Constraint |
|---|---|---|---|
| Material | Cement | ASTM Portland Type I | 500 to 550 Lbs/Cyd |
| MQP | Water/Cement Ratio | na | < 0.45 |

FIG. 10B

APPARATUS AND METHOD FOR A VERTICALLY INTEGRATED CONSTRUCTION BUSINESS

This application claims the benefit of the earlier filing date of provisional application No. 60/194,468 filed on Apr. 4, 2000.

FIELD OF THE INVENTION

The present invention generally relates to a system and method for a vertically integrated construction business and more specifically to a system and method for employing the World Wide Web to vertically integrated the concrete materials procurement, specification, submittals, quotation, testing for compliance with the specifications, automated mixture optimization, and manufacturing processes in the construction industries.

BACKGROUND OF THE INVENTION

Many items, especially in the construction industry, are actually made up of a complex mixture or compound of different constituent materials. Hence, as each group of the underlying materials themselves vary in physical and chemical attributes, the resulting compounds or materials may become even more complex and varied. Further, some constituent materials, although specified to be the same, may differ substantially in physical and chemical attributes when the constituent material is produced or found at different parts of a country or even the world. Hence, many of these construction materials, when made from similar underlying materials found at different parts of the country, may actually be quite different in physical and chemical specification.

One example of such a complex and varied material is concrete. Concrete may be comprised of many different constituent materials. For example, a typical batch of concrete may include: cement; water to hydrate the cement and make it set or harden; aggregates such as sand, gravel, and rock; and minerals and chemicals which may improve strength and durability or lessen/accelerate the setting time of the concrete. Thus, various types of concrete include fibers embedded in the concrete, flyash, silica fume, slag, and/or other chemicals added to the mixture to give the concrete various physical or chemical qualities. Many of these constituent materials vary across geographic regions. For example, a gravel aggregate quarried in North Carolina may have vastly different properties than a gravel aggregate quarried in Utah. Put another way, nominally the same ASTM Type I cement manufactured by two different vendors may result in entirely different performances in otherwise the same mixtures. Typically, a specification for concrete must take these differences into account.

Additionally, the characteristics of these constituent materials may change as time passes from their production. Hence, many of the constituent materials must be incorporated into a concrete mix within a certain distance from where they are found or produced. Also, the mixed concrete must preferably be used (poured) within a certain distance from the mix plant.

The combined effects of geographic differences in materials and a finite usage area make the concrete industry very regionalized. Specifically, different specifications for the finished concrete will be satisfied using different mix recipes and different constituent materials in different geographic areas.

For example, completed batches of concrete are typically only suppliable within a one hour drive of the construction site. If longer than an hour elapses, the concrete characteristics may change, even slightly. Likewise, although chemical additives and cements are generally suppliable over any distance, aggregates are often suppliable only within about a 20 mile radius of the construction site. Formwork may be suppliable within a 500 mile radius, and trucks and/or finishing equipment may be come from just about anywhere on the same continent as the construction site.

Because concrete (or some other building or construction material) varies so much depending on what specific materials are used to produce the mixture, concrete is generally known by the instructions (called recipes) for mixing the concrete or by the physical and chemical attributes of the resulting concrete. These recipes detail the types, quantities and the specifications (such as ASTM), and sometimes even the geographic location of the aggregate materials that make up the concrete. Each recipe is intended to produce concrete that has certain physical or chemical attributes, such as a certain strength after a certain number of days, a certain curing time, a certain durability, or a certain color. Hence, the concrete may be known as a recipe for mixing, or as a collection of specifications for the final concrete to have.

The concrete specifications or the constituent materials that make up the concrete may be described according to user preferences (e.g., the architect, engineer or contractor—AEC—who specifies the concrete), or may be defined by an owner industry standard such as in the case of DOTs (Departments of Transportation). These definitions of concrete are generally either prescriptive (e.g., minimum cement content not less than 500 PCY), performance driven (minimum 28 day strength of 3,000 psi), or a combination of the two. The design and specifications of concrete mixtures used by the construction industry are guided by engineering practice standards and specifications from the U.S. and worldwide professional bodies, and these specifications use standard materials whose specifications are collected in large volumes, with each specific standard being referenced with a unique identification number.

In the United States, the dominant standards organization for concrete engineering and construction is ACI (American Concrete Institute) and ASTM (American Society for Testing and Materials) is dominant for materials testing and specifications. However, even these standards may be tempered by either state or local building codes which may alter these standards because of local conditions, or may provide additional standards to be met. AASHTO (American Association of State Highway and Transportation Officials) and the various Department's of Transportation (DOTs) standards are dominant for infrastructure (roads and bridges). For heavy structures, such as a dam, the U.S. Bureau of Reclamation or the Army Corps of Engineers may be the governing standards body. In this way, the standards bodies are varied and/or geographically diverse.

As described above, each of these standards organizations may classify and name concrete mixes and constituent materials according to their physical and chemical properties, as well as the type of application. Users may further refine or modify these standards with their own additional or alternate standards. This combination of standard-based and user-defined mixes and materials make the whole universe of concrete specifications and mixture types number in the millions.

Typically, constituent materials are specified in relation to standards. Likewise, concrete batches are generally not specified according to standards (standards organizations don't specify concrete).

However, the concrete specifications (including a list of individual specification items) may generally be either prescriptive or performance-based. A prescriptive specification item preferably references specific constituent materials and the materials' attributes and/or constraints while a performance-based specification lists the physical and chemical characteristics of the concrete after production. A concrete recipe or specification may include both prescriptive and performance-based specifications.

Testing on the concrete and the constituent materials is used to both specify materials/mixes and verify compliance with standards and user specifications. Some common tests for concrete properties include strength tests and time-related measurements that provide for a characteristic and a time period in which to measure the characteristic. The strength of the concrete is preferably measured using a block of the concrete in a predefined geometric orientation that is crushed to compression. The block may be performed on 4×8" or 6×12" cylinders, prisms, beams, or cubes. Sample time-related measurements may include the air content, air temperature, concrete temperature, shrinkage, slump, chloride permeability, and unit weight of the concrete. For example, the slump of the concrete is the distance that a standard 12 inch cone of cement will slump down after the mold is pulled off. Slump is a time-variable property.

These tests may be performed on the parent of the test specimen (i.e., the concrete batch from which a specimen was taken), any material within the specimen (e.g., a chemical within the cement), or any composite material that is made out of the material of the specimen (e.g., for a specimen of cement, a batch of concrete made out of the cement).

Because the test results may vary from machine to machine or place to place, the testing machines are preferably also known by a unique name or serial number. These testing machines may include a compression testing machine, Qdrum (heat of hydration), QuadLogger data logging device for recording temperature maturity, air pot, cylinder mold, sieve, or any other type of test equipment. As strength, the heat hydration is an important property of a cementitious mixture and is automatically measured using the Qdrum heat signature calorimeter. The heat signature thus generated enables automatic screening of cement/mineral/chemicals combinations in concrete for quality control, as well as simulation of concrete field performance through materials science modeling.

The different properties of the different concretes may be made part of industry standards. Typically, ASTM, AASHTO, or some other standards body puts bounds on a set of quantifiable materials properties as potentially measured through a set of specified tests. Some examples would be ASTM C150 for Portland cement, ASTM C33 for concrete aggregates, and ASTM C494 for chemicals and mixtures. Unlike mixes, constituent material (e.g., cement) specifiers preferably do not specify the materials specifications. The constituent materials are generally only selected from a list of available standards as permitted in a particular market.

The lab services that test and authenticate the integrity of the materials or the finished concrete are also typically located within a certain distance of the construction site or batch plant. For example, lab services on crushing are preferably located no more than 100 miles form the construction site. Likewise, lab services on mix design are typically located no more than 1000 miles from where the mix was created. The concrete exchange of the present invention typically automatically takes these constraints (or a user's own geographic constraints) into account, and will not offer solutions that conflicts with these standards.

Likewise, an entity in the concrete or other construction industry often defines its own specifications for materials or finished products. Rather than choosing from the various constraints and materials from the standards organizations, many AEC's and other entities define tighter constraints which must be met for a specific job.

Preferably, one or more of the objects of the present invention or disadvantages of prior systems are addressed by one or more of the presently described preferred embodiments of the present invention.

SUMMARY OF THE INVENTION

An apparatus and method for a vertically integrated construction business. More specifically, an apparatus and method for employing the World Wide Web in a business that vertically integrates the concrete materials procurement, specification, submittals, quotation, testing for compliance with specifications, automated mixture optimization, and manufacturing processes in the construction industries.

In one aspect of the present invention, a relational database is provided with linked data objects that describe physical and chemical quantifiable properties. These quantifiable properties are preferably used to specify test methods which may then be used to create both standards-based and manufacturer-based specifications for concrete constituent materials. These standards-based materials may be used to specify generalized brand named materials.

Concrete recipes utilizing the defined specifications are developed either prescriptively or performance-based. Prescriptive specifications list materials while performance-based specifications are based on material attributes. Concrete recipes comprised of standards-based materials (basemixes) can be instantiated into production mixes using "real-world" local materials. In this way, one generic basemix may be used at different geographic locations to produce actual production mixes.

In one aspect of the present invention, the various batch plants and distribution entities may monitor the concrete mixing process and provide real-time feedback (via XML) to the batch plant as well as to the present system. This feedback may include local environmental conditions or an error in the production batch (which may be communicated to the driver of the concrete truck via cell phone, pager or in-truck global positioning system).

The test methods of the present invention may be used to specify materials and concrete recipes and may also be used in a verification of compliance with standard or manufacture-specified tests. Samples of the concrete or concrete constituent materials may be taken at any location and the results of the tests may be provided to the system entities via XML over the Internet.

BRIEF DESCRIPTION OF THE DRAWINGS

The present invention and its presently preferred embodiments will be better understood by reference to the detailed disclosure hereinafter and to the accompanying drawings, wherein:

FIG. 5 is a flow chart of a process for creating material brand names;

FIG. 10 shows examples of both performance-based and prescriptive concrete specifications;

DESCRIPTION OF THE PREFERRED EMBODIMENTS

The present invention provides a system and method for a vertically integrated business to business exchange, whether within public or private marketplaces, that is specifically tailored to complex business where certain products are made of combination of various constituent materials. The system may be particularly useful in industries that contain constituent materials and final products that are described by both standards organizations and user-defined specifications. Also, the final products and constituent materials may be geographically disparate, time sensitive, and of great variety.

Although the invention may be useful for a variety of vertically integrated business to business industries, or corporations operating their own private marketplaces, a presently preferred embodiment will be described with respect to the concrete industry. Because concrete mixes, which may be described by standards or user specifications, are typically created from many constituent materials that are geographically and time dependent, the concrete industry provides a good example of use of the present invention. However, nothing specific to the concrete industry should be used to limit the scope of the present disclosure or the appended claims to any particular embodiment.

Figure 1:
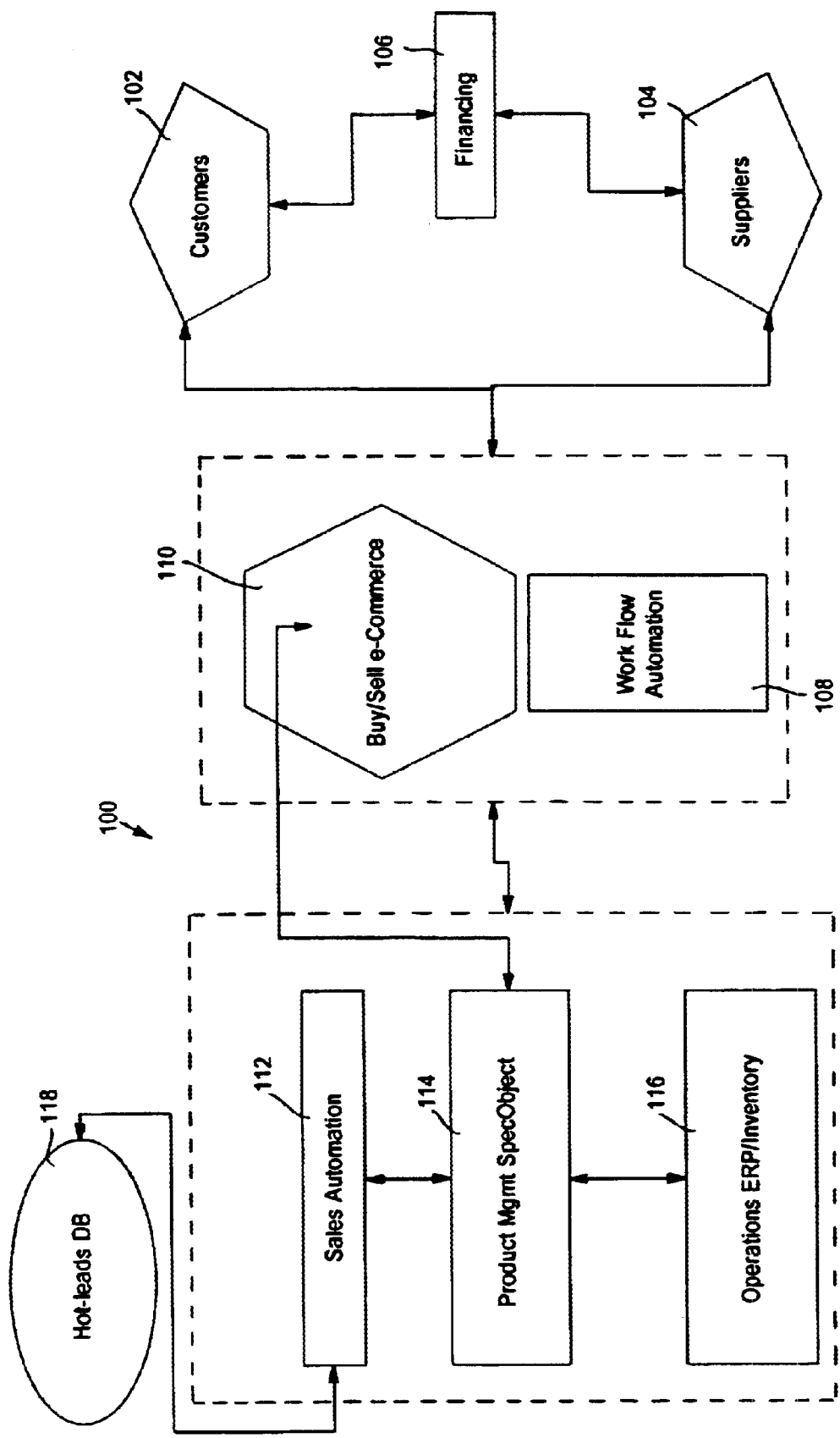
FIG. 1 is a top level flow chart of the concrete system.

FIG. 1 is a high level flow chart of a vertically integrated concrete system 100 as an example of the present invention. In FIG. 1, there is depicted a group of customers 102 who require some type and amount of concrete and a group of suppliers 104 who may provide the concrete or some constituent materials used in the production of the desired concrete. Both of these entities may require financing 106 for their activities.

The concrete buyers and sellers are linked to a work flow automation block 108 and a buy/sell e-commerce block 110. The buy/sell block 110 represents the buying and selling of concrete and concrete constituent materials over the Internet or some other electronic medium. This is linked to a sales automation block 112 which includes the hardware and processes for selling the concrete and the constituent materials. This sales automation block 112 may be connected to a "hot-leads" database 118 which contains a list of all of the active concrete products that currently exist in a certain geographic area, or the world.

The sales 112, e-commerce 110, and workflow automation blocks 108 are also connected to an operations—ERP/Inventory block 116 and a product management—SpecObject block 114. Together, these functional flow chart blocks define a system for electronically linking a customer who has some concrete-specific need with a supplier or suppliers capable of fulfilling that need.

Because the various types of concrete specifications and underlying materials number well into the thousands, there may literally be millions of different possible concrete mixtures that can be produced. Also, because the concrete itself, as well as many of the constituent components (cement, aggregates etc.) are known according to the standards of many different organizations, translation of these recipes may be further complicated. Finally, because concrete and its constituent components vary greatly over geographic regions, determining the proper materials to produce concrete of a certain quality with certain characteristics may further be complicated.

A web-based concrete system may be useful in matching a type of concrete to a concrete specification, matching a concrete mix recipe to a type of concrete, or finding local materials to produce concrete with certain qualities. By centralizing the information and easing the user interface, the web-based concrete system may allow a more efficient and orderly exchange of concrete or any other building or construction material. To seamlessly integrate these concrete processes, the standard specifications, manufacturer specifications, local concrete materials, concrete recipes, and all other facets of the concrete industry should preferably be reduced to "standard" descriptions that can be stored as part of a database. The elements (data structures) of this database can then be linked together (relational database) for functionality.

This relational database can then be used to provide conversions from one local concrete recipe to another, or from one constituent material to another. In this way, the present concrete exchange system may "nationalize" or decompartmentalize the entire concrete industry. With the aid of the present invention, a local concrete manufacture's recipe (which uses locally obtainable materials) may be translated to a recipe utilizing materials found on the other side of the country. Also, a concrete specifier who needs concrete that meets certain physical or chemical requirements at various locations across the country may be able to easily locate local concrete manufacturers in each geographic region to fulfill this need. To operate this relation database, all of these database elements must be created and linked to each other in a logical way. The following description describes the steps in such a procedure. A sample database architecture is described below, however, an in-depth view of the system is first provided.

The web-based concrete system may generally be comprised of various materials processes and various concrete processes. The materials processes generally classify and inter-relate the different component parts of the concrete to each other, to concrete mixes, and to standard or manufacturer material specifications. The concrete processes generally provide for the same types of inter-relations with respect to the concrete mixes and to the physical and chemical attributes or specifications of the poured concrete. In this discussion, the materials processes will be discussed first, and the concrete processes will be discussed thereafter. However, these two processes may be integrated into one concrete system wherein each part of the concrete production process may be related to and facilitated by other parts of the concrete system. After the following detailed discussion, an example of a relational database structure for carrying out the present invention is provided.

Figure 2:
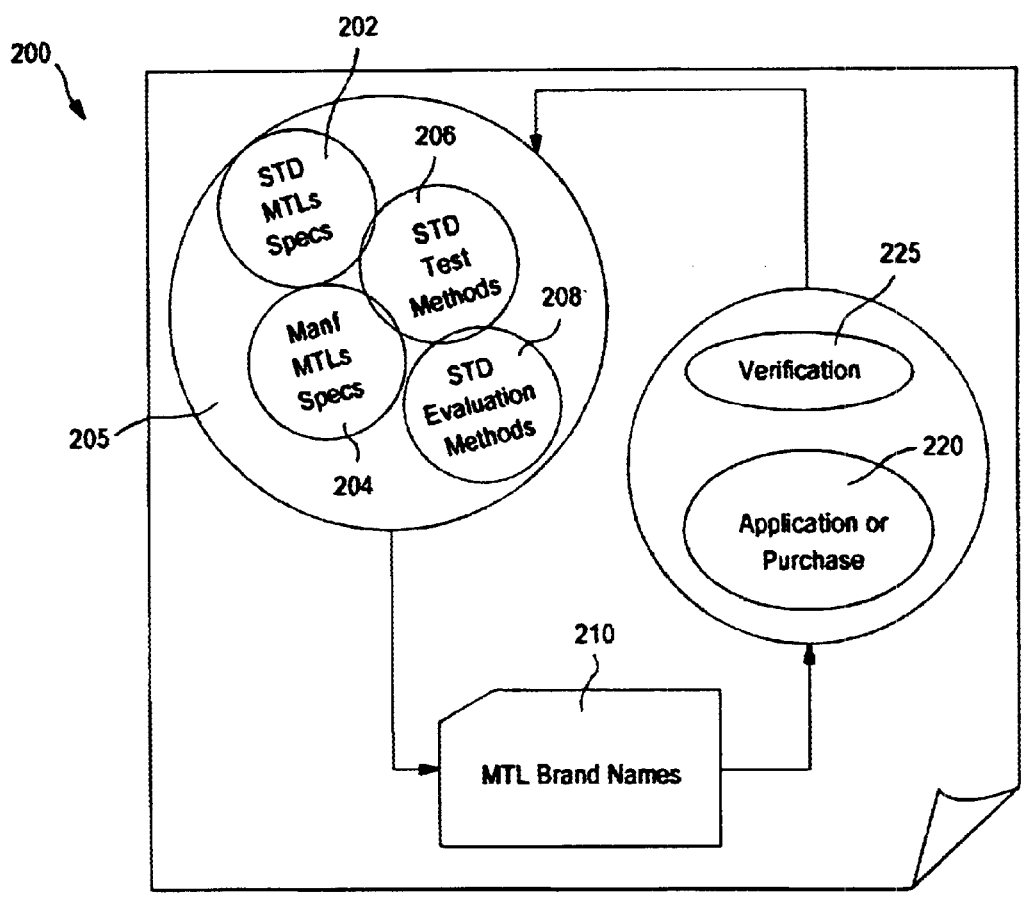
FIG. 2 is a flow chart of one embodiment of materials processes as part of a concrete system.

FIG. 2 shows a diagram of the general flow of the materials processes 200 as part of the present vertically integrated concrete system. The various sections in this diagram represent processes for creating linked database objects for various parts of the materials process 200. Their inter-relation will be described immediately below, and each process individually will be described in more detail following that section.

The materials that make up concrete may generally be classified or cataloged 205 by way of both standards-based specifications 202, manufacturer specifications 204, standard test methods 206, and standard evaluation methods 208. The various elements of these different classifications are broken down into finite data pieces or objects which reside on the database. These objects can then be linked together to give the database functionality. Rather than keeping all the different representations of the data separate, the various tests, standards and specifications can be inter-related to each other.

The standard materials specifications 202 define various characteristics of a material as per guidelines set forth by different standards organizations. The organizations (such as AASHTO and ASTM) basically define concrete component materials based on a certain set of properties about those materials. There may also be manufacturer materials specifications 204 which define similar materials by the same or different properties. This may be important because a particular manufacturer may have additional properties (or the same properties more narrowly defined) that they feel are important in which to define the materials. By translating both sets of specifications 202, 204 to objects, the present system preferably facilitates inter-relation between these various standards.

There may also be standard test methods 206 which are standards-based tests to be performed on a material to determine the properties of the material. More specifically, the standard test methods 206 detail methods for measuring a materials properties, and the results of these tests can be used in standard materials specifications 202 to describe a certain material. Related to these standard test methods 206 are the standard evaluation methods 208. The standard evaluation methods 208 may be used to define a statistical method for interpreting the results of the standard test methods 206 to create the standard materials specifications 202.

For example, a standard material specification 202 may state that a material should have a strength greater than 2500 psi. A standard test method 206 may further state that to test that material for strength, you take 50 samples of the material of a certain size and a certain shape and put these samples into a certain "crushing" machine which reads the strength of the material by failure analysis. The standard evaluation method 208 may then tell how to statistically interpret the data from those 50 trials. One particular standard evaluation method 208 may say that if 95% of those 50 trials satisfy the material specification, then the sample passes and the particular material satisfies the particular standard materials specifications. Another method specifies that the probability that any individual test is more than 500 psi below the specified level shall be less than 1 in 100.

In all, the diagram group 205 basically represents the translation into database objects and inter-relation of the objects in the database of the various ways to classify, test, and evaluate concrete constituent materials.

In order to sell concrete (or most any material), however, you may need to create name brands 210 that consumers can recognize. In order to accomplish this, one preferred embodiment of the present invention may provide a material brand name section 210 of the database where brand names are created and linked to the various materials specifications 202, 204, test methods 206, and evaluation methods 208 described above. For example, the name brand cement, Continental Type I, may satisfy certain standard 202 and manufacturer 204 specifications. The material brand name process 210 represents the process for creating and linking this database section.

After the brand names 210 are created and linked to the specifications 202, 204, test methods 206, and evaluation methods 208, the resulting material may either be used in an application (used in a concrete mix) or purchased by some concrete vendor or supplier 220. In either case, there is preferably a verification test 225 that allows the subsequent user or purchaser to verify that the material brand name indeed does satisfy the various specifications 202, 204, test methods 206, and evaluation methods 208 that the material purports to satisfy. The circular nature of this specification 205, brand naming 210, and application/verification 220, 225 material process is represented by the flow arrows in FIG. 2.

The above section describes the general flow and inter-relation of the materials process database objects. To aid in the understanding of the present invention, the following will detail the creation and inter-relation of each of these "sub-processes" for one preferred embodiment of the present vertically integrated concrete marketplace.

Figures 3A, 3B:
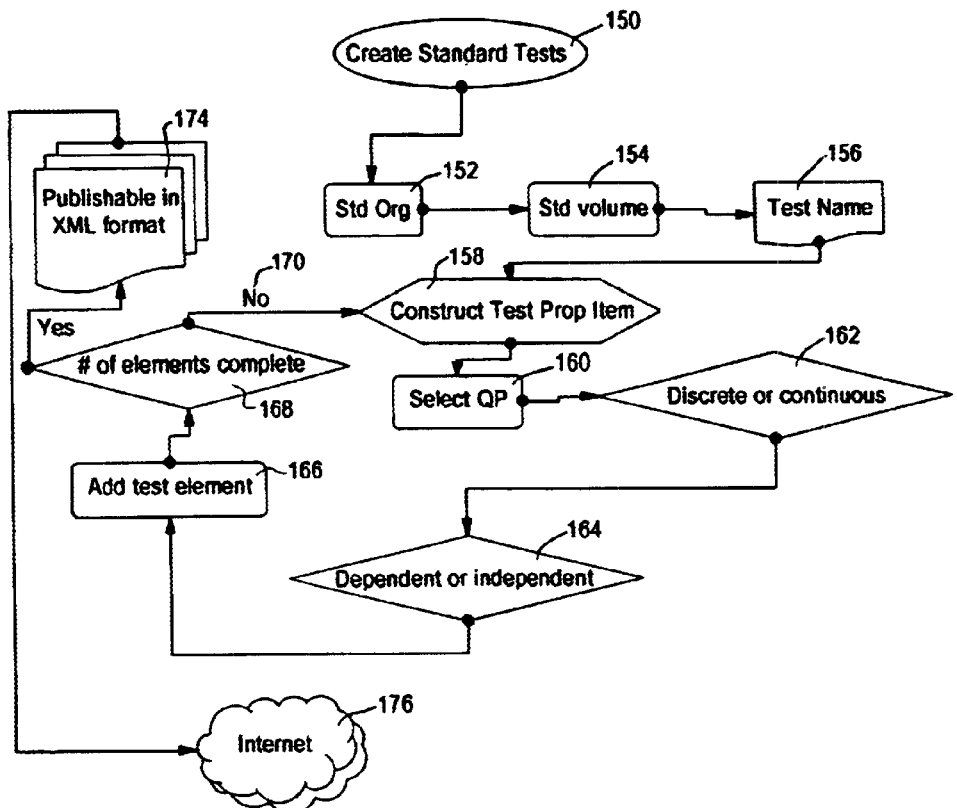
FIG. 3 is a flow chart of a process for creating standard test methods.

FIG. 3 details one preferred method for creating a standard test method 206. Because the standards are based on written or other materials produced by a standards body, the creation of a standard test method begins 150 by providing the name of the standards organization 152 (e.g., ASTM, AASHTO, etc.) and the book volume number 154 in which the standard can be found. Next, the name given to the test by the standards organization (or a unique new name) is preferably is added to the test method 156.

Next, a test property item is constructed 158. The test property item defines one or more quantifiable properties to be used in a test that is to be performed on the concrete or concrete constituent material. There may be hundreds of different possible quantifiable properties ("IQPs") to choose from including strength, shrinkage, age, air contents, chemical contents, slump, and specimen type. For each test property item being constructed, one or more QPs may be selected based on what quantifiable properties are needed to perform the test. The attributes of these QPs that satisfy the constructed test may then be defined.

For example, the quantifiable property may be continuous or discrete 162, or the QP may be dependent or independent 164 of other QPs or test properties. A continuous QP may vary over a range of values while a discrete QPs value may be selected from a pre-defined group of possible values. A dependent QPs value depends on the values of other QPs while an independent QP may not depend on others.

Once the QPs attributes are defined, the test element may be added 166 to the test property item, and the list of completed elements may be checked 168 to determine if all of the necessary test elements (QPs) have been defined and added. If the elements aren't all complete 170, then the next QP is preferably selected 160 (for example, from a drop-down list of QPs) and defined 162, 164. When the proper number of elements are complete for a test property 172, then the test property item may be published on the Internet 176 in XML 174 (extensive markup language) or some other hypertext-based or other online document publishing format. The construction test property is now preferably viewable and usable as part of the web-based concrete system. For example, the created standard test method may be used in the specification of, or to describe, the verification of constituent materials. The conversion to the XML 174 or other common format may enable more users to view and use the concrete database information. The Internet 176 publishing may help accomplish this task also.

As an example of creating a standard material test property 206 item, FIG. 3 shows a concrete test of the compressive strength as a function of age in days measured on 6"×12" cylinders as per standard ASTM C39 178. This construction test property item is preferably comprised of three test elements or quantifiable properties: strength 180; age 182; and specimen type 184. Here, on the first pass through the test property construction loop 158, the strength QP 180 is selected 160 (e.g., from a drop-down list of selectable QP choices) and defined as continuous 162 and dependent 164. Strength may be continuous because the strength can be almost any value over a continuous range of values (rather than selected from a group of pre-selected discrete values) and strength may be dependent because its current value depends on the value of other QPs (e.g., age and/or specimen type). In other words, the "strength" of the material only makes sense if it is given at a specified age or in relation to a specific specimen type. Strength may then be added to the test property 166, and because more QPs must be defined for this test 168, 170, another test property item must be constructed 158.

On the second pass through the test property construction loop 158, The age QP 182 is selected and defined as continuous (age values are continuous) but is independent from the other QPs (e.g., age does not depend on what type of specimen is used or the specimen's strength). FIG. 3 shows that age may also be selected from a list of choices of ages in days.

Finally, the specimen type QP 184 is discrete 162, independent 164, and selected from the various possible geometrical configurations. It is discrete because the standard is only defined for certain discrete test geometries, and it is independent because the geometry is not based on the other QPs (e.g., age or strength). Here, it is shown that the specimen type may be a cube, beam, cylinder, or other configuration 184. Once all of the pertinent test items (quantifiable properties) are defined, the standard test method may preferably be published in XML format over the Internet.

The selection of each QP and each characteristic of the selected QP preferably are chosen by the user through the use of a graphical user interface which aids in this selection. For example, drop-down menus or "fill-in-the-blank" records may be used for values.

The above-described method for creating a standard test method 206 as part of an object-oriented database is generic and may work with the construction of any test method defined by any standards organization. Looking back at FIG. 2 also shows that one or more standard evaluation methods 208 may be created in a way similar to the above-described standard test method creation 206. An evaluation method 208 may be a method for statistically interpreting the results of a test method 206 as described above with respect to FIG. 3. The evaluation method component parts are preferably also converted to objects as part of the concrete exchange system.

Figures 4A, 4B:
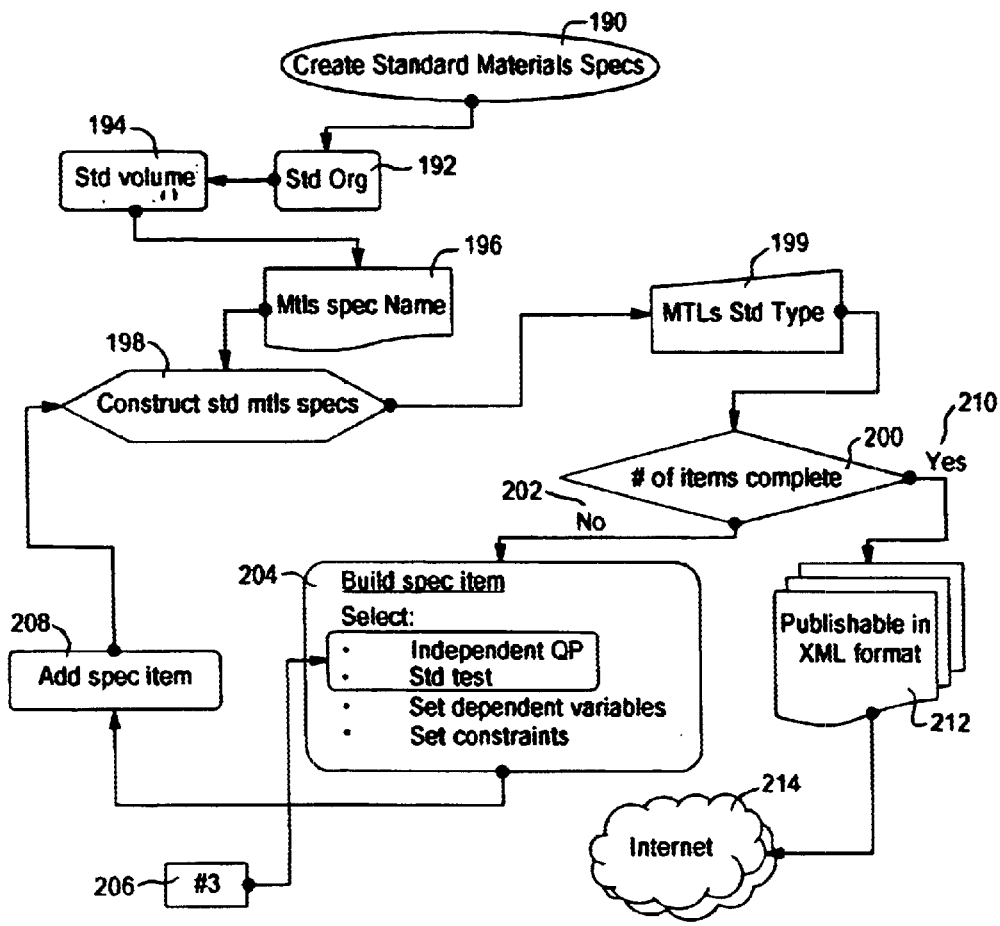
FIG. 4 is a flow chart of a process for creating standard materials specifications.

Databases that contain standard materials specifications 202 and manufacturer materials specifications 204 may also be created as part of the web-based concrete system. The materials specifications are generally lists of tests or properties that a material must pass or satisfy to satisfy the specification. They can be defined by a standards organization, by a particular manufacturer, or by another entity. FIG. 4 is a flow chart of one presently preferred method for creating standard materials specifications 202. Again, this process may begin 190 with the labeling of the standard materials specification 202 with the standard organization 192, standard volume number 194, and a standard materials specification name 196. The method may then provide for constructing a standard materials specification 198. This standard material specification is comprised of one or more specification items that are comprised of various quantifiable properties, standard tests, dependent variables set at various levels, constraints set at various levels, and/or additional items.

The standard material specification construction 198 method may first determine if all of the items in the specification have been created or defined 200. If not 202, the system may request that the user build a specification item 204 by inputting the various QPs and identifying the standard tests that make up this specification item. These two items may merely be selected from those previously created and added to the database in the process explained above and depicted in FIG. 3 (206). They may preferably be inputted or linked directly from the FIG. 3 database to the present database. The QP may or may not include one or more dependent variables and constraints for the QP. These variables and constraints are preferably preset to a certain level to complete one specification item in the standard material specification.

After each specification item is built 204, it is preferably added to the standard material specification 208. If the standard material specification includes additional specification items, this building process repeats. When all of the items of the specification are complete 210, the specification is preferably published on the Internet 214 in XML format 212 or some other hypertext-based or other online publishable format. A complete standard materials specification 202 may preferably be comprised of many specification items, such as various physical and chemical properties of the material.

As an example of creating a standard material specification, FIG. 4 depicts a specification for a Portland Cement as per ASTM C150. This material specification may preferably includes over 30 QPs, 18 test methods, 8 formal types, and 75 types with options.

Therefore, as different quantifiable properties are chosen and tested within different constraints, different "types" of cement (that all fall under ASTM C150) may be produced. Hence, this method will produce a list of cement (or other material) "types" that can be used by the system at various other stages of concrete material procurement or specification.

As an example, two (of the 30–40) QPs for Portland Cement Type I are shown. A first quantifiable property may be the physical property "strength." According to the ASTM C109 standard, the strength of Portland Cement Type I must be greater than 1740 psi at an age of three days 216. Following the method, this first specification item is created 204 by selecting the strength quantifiable property and C109 standard test from the database created with respect to FIG. 3 (206). The dependent variable (age) is set to three days (according to the C109 test) and the constraint for the strength QP at 3 days is set to "greater than 1740 psi." This process preferably completes one specification item.

Because there are more specification items to be defined, the process cycles through the standard materials construction loop 198 again (until all of the specification items have been defined and set). On the second pass through the loop, a chemical property, MgO amount, is created according to ASTM C114 218. There are no dependent variables in this case, and the constraint is set to the appropriate level (greater than 6%). Once all of the specification items are completed 210, the standard materials specification is preferably published over the Internet 214 in XML 212 (or some other) format.

As shown in FIG. 2, it can also be seen that manufacturer materials specifications 204 may be a part of the present invention. Rather than being based on some standard organization, a manufacturer material specification 204 may include unique tests, quantifiable properties, and/or variables and constraints. In this way, a specific manufacturer or manufacturers may define their own criteria for materials to be produced. The creation of such a manufacturer material specification 204 may preferably be similar to the creation of the standard material specification shown in FIG. 4. Typically, a manufacturer material specification 204 will be similar to a standard material specification, but may include either more restrictive constraints on certain QPs or a modified list of specification items.

FIG. 2 also shows a database or other storage device that preferably holds a collection of material brand names 210. This may preferably be a database of material brand name objects 210 that are linked to the previously described specifications. The material brand names 210 preferably contain attributes that are related to the material specifications name, but (as seen above) the material specifications are comprised of multiple standard tests. In this way, the material brand name 210, through the use of the present linked database objects, is likewise connected these standard tests. FIG. 5 details one preferred way to create a material brand name 210 for use with the present invention. To create the material brand name 210, it is preferable to construct one or more material specification attributes. These attributes may define what standards are associated with each material brand name 210 created.

The brand name creation method may first check to see if all of the necessary material specification attributes have been defined 222. If not 224, then the user may enter the standard organization 226, the standard volume 228, and the materials specification name 230 for each specification attribute. Then, the user may preferably select the appropriate materials standards type 232, which may preferably come from the process described above with respect to FIG. 4 (linked via the database) 234. As described above, the materials may be known by a "type" (such as "Portland Cement Type I") based on the selected constraints for each QP.

After each of a material brand name's specification attributes is complete, it may preferably be added 236 to the material specification attributes. Once all of the attributes have been defined for a material brand name, the brand name may preferably be saved in a material brand data repository 238 and published on the Internet 242 in XML format 240 or some other hypertext or publishable format.

By way of example, FIG. 5 shows the creation of a cement with the brand name "Continental 1A2" which has two sets of material specification attributes. The first attribute (#1) 244 is an ASTM volume 4.01 standard. The material specification name is C150 and the material standard type is I. The second attribute (#2) 246 is an AASHTO volume 2 standard. The material specification name is ASH140 and the material standard type is II. Note that standard cements ASTM Type I and AASHTO Type II are preferably created by the process in FIG. 4. Thus, because of the linked object database structure, the brand name cement "Continental 1A2" may automatically know that it satisfies both ASTM Type I and AASHTO Type II (or Canadian Type B, etc.) all at the same time. This may preferably give the present concrete system the ability to work across standards and material brand names with a more seamless integration than by present methods. For example, by requesting a cement by a particular "standard name," cement providers from different geographic areas, who utilize different standards and brands, may all provide cements that meet this standard name.

Figure 6:
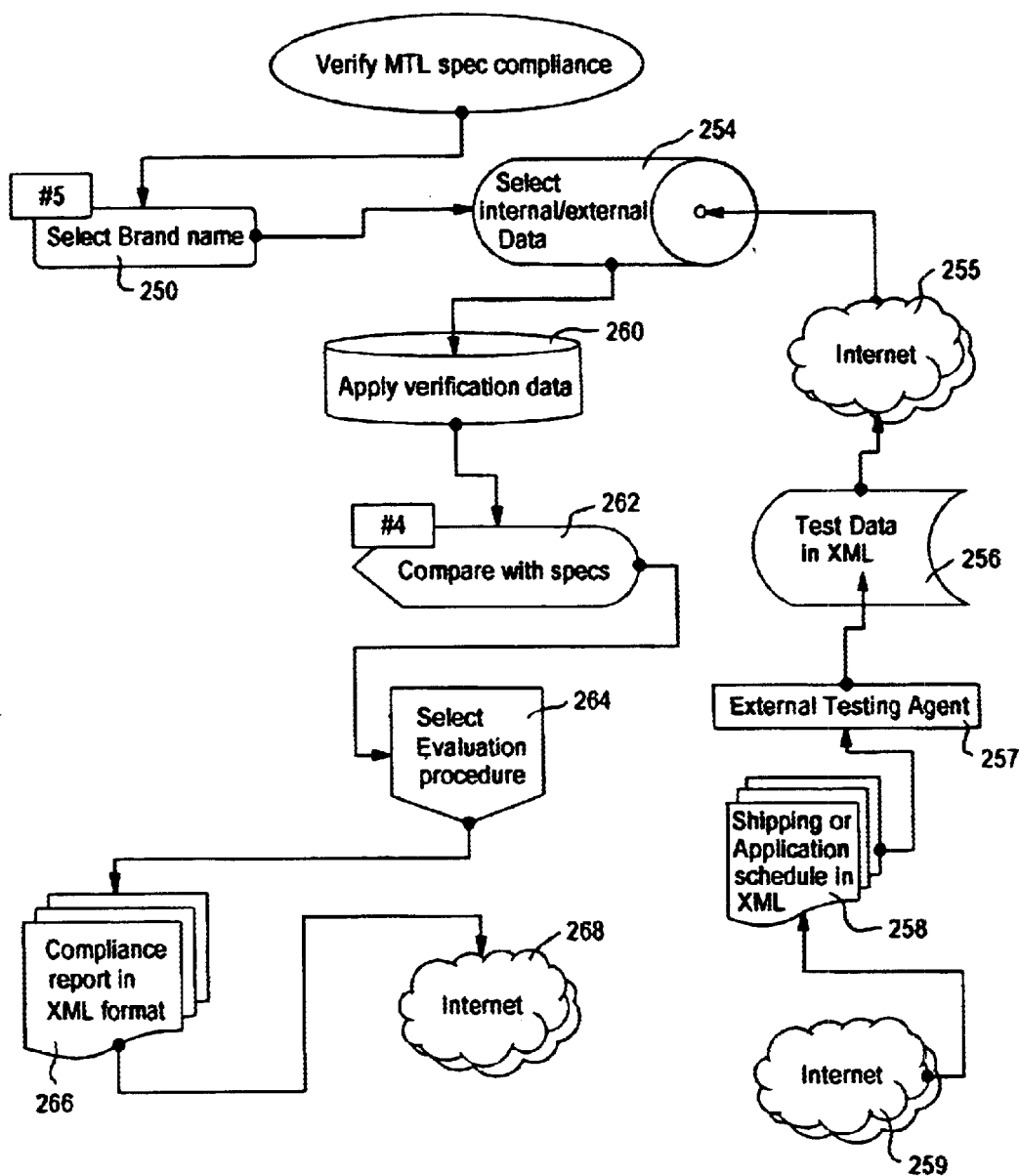
FIG. 6 is a flow chart of a process for verifying specification compliance for a selected material brand.

As shown in FIG. 2, another aspect of the present invention may allow for the verifying of material specification compliance 225. This may be useful when a specific material is either purchased by a vendor or applied/used in concrete by someone 220. FIG. 6 details one preferred method for verifying specification compliance 225 for a selected brand name material 210. First, the user preferably selects a material brand name 250 which may come from the database of brand names created as part of the FIG. 5 process (linked objects) 252.

A group of pre-captured test data is then selected 254 to be verified and compared to the specification. For example, a user may perform 50 iterations of a test on a material and present the system with the data from these 50 trials. Alternatively, this data may come from some external source 256 (for example from a computer at the manufacturing or job site or from a testing laboratory that is connected to the Internet 258). This may be useful when multiple parties associated with one concrete job all want to participate in one common testing procedure. The data may be presented to the verification system in an XML format 256 or in some other web-publishable format.

The verification data are then applied 260 and compared with the specifications 262 to determine whether or not the material has satisfied the criteria set forth in those specifications. The specifications may preferably come from those created or defined with respect to FIG. 5. After the data is compared 262 to the specifications, an evaluation procedure 264 is selected. The evaluation procedure 264 is used to determine whether the selected material brand has complied with the applicable specifications. For example, the evaluation method (set by a standard or an engineer) may define a successful evaluation as 95% of the trials satisfying the specification. The procedure may produce a compliance report 266 that details the degree of compliance or non-compliance with the various specifications. This report 266 may be published on the Internet 268 in XML format or in some other document publishing format (so all user of the system may preferably view the quality of a material from a specific source).

Figure 7:
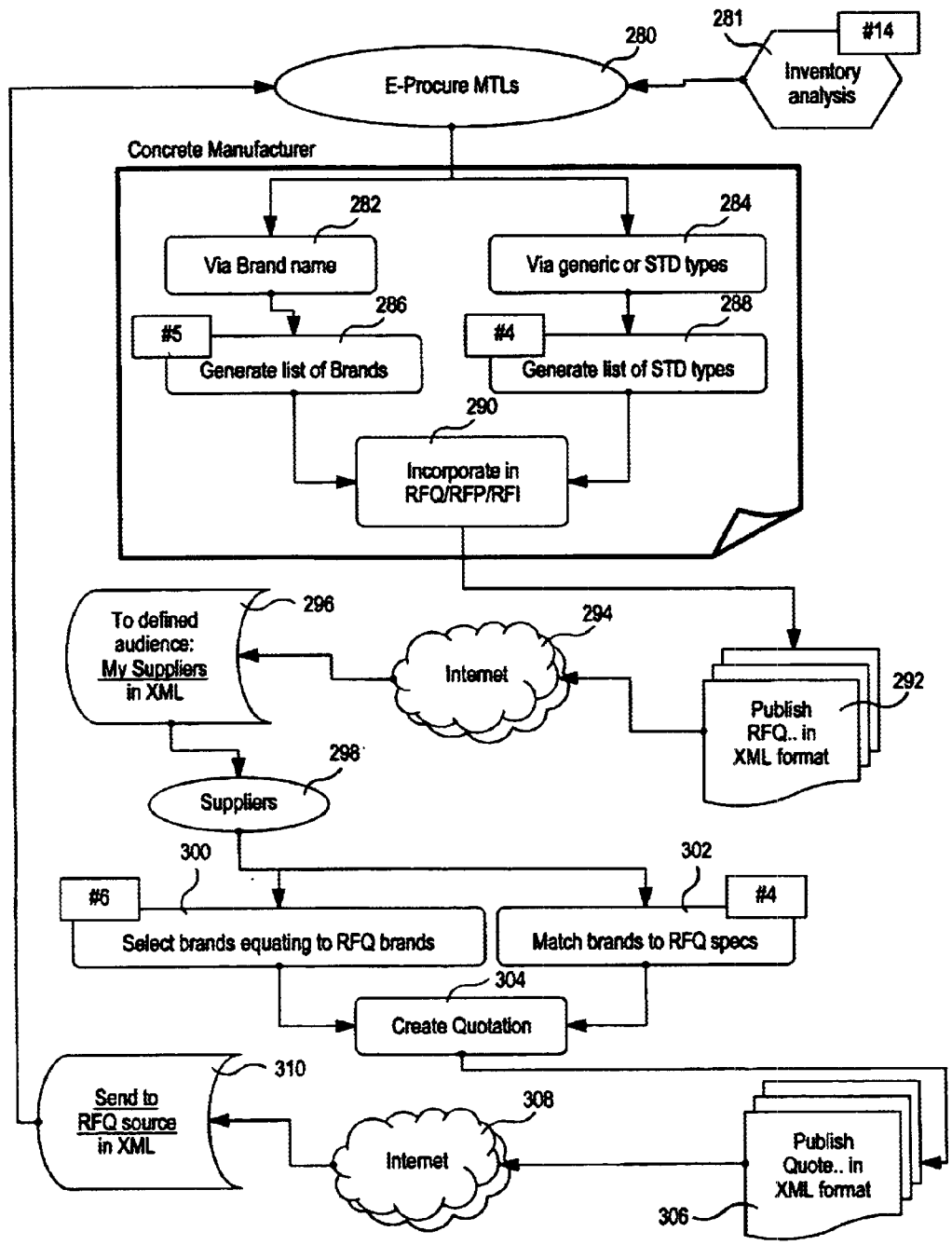
FIG. 7 is a flow chart of a process for materials procurement.

In the above discussion, we have detailed the creation of various specifications 202, 204, testing methods 206, evaluation methods, 208 and verification methods 225 for the materials that make up concrete or some other construction or building material. Before moving on to the concrete-specific part of the web-based concrete system, it should be noted that this materials system may facilitate more efficient procurement of the concrete materials than by conventional processes. FIG. 7 shows a flow chart of one preferred method for enabling material procurement as part of the present invention. This procurement by the present method may be useful not only for securing appropriate materials for a construction job, but also to prove to various standards bureaus or job administrators that appropriate materials were secured (because of the verification processes within the present concrete system).

As seen in FIG. 7, the "e-procurement" or Internet or web-based procurement of concrete materials 280 (from a concrete manufacturer's point of view) may be facilitated by the present concrete system. A concrete manufacturer may procure or purchase materials for a certain concrete batch by specifying either the brand names for the materials 282 or the generic or standard type of the materials 284. Creation of these brand names 282 or standard materials lists 284 was described above (FIG. 5). If the concrete manufacturer has a recipe for a concrete mix that lists specific brand names as defined by the concrete system, the manufacture may generate a list of the brand names 286 (and quantities needed) and incorporate this information into a materials request (RFQ/RFP/RFI) 290. On the other hand, if the concrete manufacturer has a concrete recipe or list of materials classified by the generic material type or a standard-based type (FIG. 4), the manufacturer may generate a list of standard material types 288 and incorporate that list into the manufacturer's material request 290. Because a user will often order multiple materials at once, the concrete system preferably allows the user to select some materials by brand name 282 and some by standard type 284 as part of the same RFQ 290.

The RFQ/RFP/RFI (request for quote, proposal, or information) request is then preferably published 292 over the Internet 294 in XML format or some other web-based document publishing format. The request may be published generally to all users of the concrete system, or the request may be published to a select subsection of concrete system users. For example, a particular concrete manufacturer may only purchase materials from a predefined group of materials providers. This group, designated "My Suppliers" 296 in FIG. 7 would be the only concrete system users (suppliers) 298 to whom the request is published and, therefore, will be the only users (suppliers) who may respond to the request.

Once the suppliers 298 receive the RFQ/RFP/RFI request, they can decide whether or not to respond to the request. The suppliers may select brands that equate to the RFQ brands 300 that were part of the manufacturer's brand name request (from FIG. 5), or the suppliers may match the materials brand that corresponds to a standard material specification listed in the manufacture's RFQ 302 (from FIG. 4). In either case, the suppliers may use the RFQ information to create a price and/or delivery quotation 304 (or whatever response is requested) to supply the manufacturer with materials to fulfill the manufacturer's concrete materials order. This quote may then be published 306 over the Internet 308 in XML format or some other web-based document publishing format. Preferably, it is only published to the manufacturer who initiated the request 310. The manufacturer may then examine all of the suppliers who have responded to his or her request, and determine which supplier should supply the materials for the concrete.

The above description detailed some preferred processes for use with the materials processes of the present concrete system invention. On the other side of the concrete system are the concrete processes. The concrete processes enable the concrete system user to mix concrete according to appropriate specifications and standards and to verify that the concrete meets these standards or use criteria. To specify, manufacture, sell, and buy concrete products, mix codes (brand names with object links to user and/or manufacturer specifications, standard and/or branded materials, and standard tests) are created. When concrete is offered for sale or applied, performance verification is preferably needed to assure specification compliance.

Figure 8:
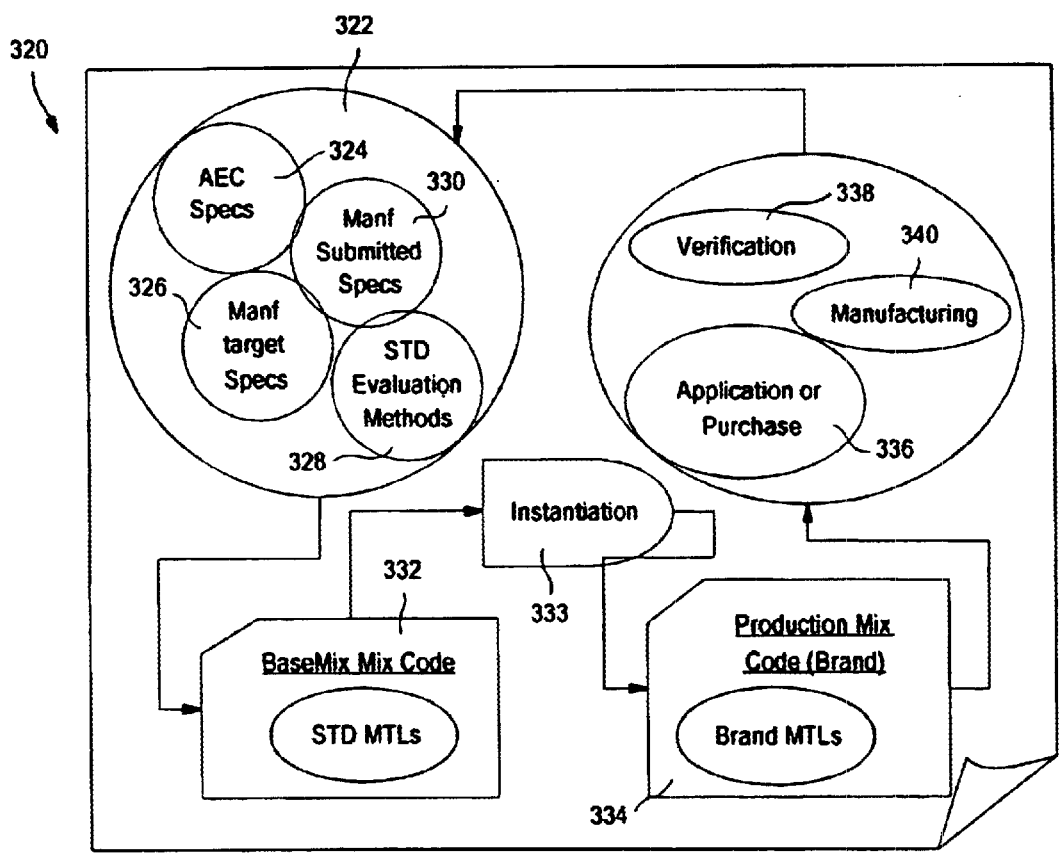
FIG. 8 is a flow chart of one embodiment of concrete processes as part of a concrete system.

FIG. 8 shows a top level flow chart of some preferred concrete processes 320 for use with the present invention. Because the concrete is made up of the constituent materials described above, these concrete processes 320 are obviously related to the materials processes 200, and various aspects and objects of these concrete processes 320 will be linked to various database objects previously described with respect to the materials processes 200.

The concrete processes 320 are generally comprised of various specification, test methods, and evaluation methods as seen in grouping 322. One difference between the materials processes 200 and the present concrete processes 320 is that standards organizations do not typically specify concrete (as they do materials). Rather, the engineering and manufacturing communities are the ones who make the specifications for concrete. If an engineer or architect designs a building, he or she may specify multiple types of concrete based on the characteristics and qualities of which the poured concrete must have over time (strength, water/cement ratio, chloride permeability, shrinkage, finish, pumpability, etc.).

The group of specifications may be comprised of AEC specifications 324—which are preferably the groups of concrete specifications for some part of a project or building. Likewise, there are manufacturer submitted specifications 330 which describe the attributes and characteristics of various concrete mixes that a particular manufacturer provides. To provide concrete that meets these manufacturer submitted specifications 330, the manufacturer may also preferably provide manufacturer target specifications 326. These target specifications 326 are the specification properties that the manufacturer shoots for or aims for when making concrete. That way, when the concrete that is produced from the batch falls short of (or overshoots) these target properties 326 (whatever the case may be), the manufacturer is reasonably assured that his batch will meet the manufacturer submitted specifications 330. The amount of difference between the target 326 and the submitted specifications 330 may depend on the particular manufacturer's experience and the quality of his plant. Finally, there may also be linked to this area 322 standard test methods 328 and standard evaluation methods for various verification or other processes.

The AEC specifications 324 and the manufacturer-submitted specifications 330 may be either prescriptive, performance-based, or both. A prescriptive specification details the concrete by recipe (e.g., quantity and type of cement, quantity and type of aggregate, etc.). A performance-based specification details a physical or chemical attribute that the resulting concrete should fulfill (e.g., strength greater than 3000 psi after 28 days of curing). A mix code may be a combination of prescriptive and performance-based specifications.

At the bottom of the figure, there are generic mix codes or "recipes" ("basemixes") 332 based on standard materials. This information is linked to production mix codes 334 (brand name codes) which are concrete recipes with reference to specific brand name materials. The basemix codes 332 are basically generic "average" mixes based on standard materials. For example "ASTM Type I cement" is a basemix 332 constituent material. It is comprised of standard-specified materials in specified amounts. On the other hand, "Continental I satisfying ASTM Type I cement" is incorporated in a mix code at a production or manufacturing location or time (concrete mixture recipe with brand name materials). In practice, a typical manufacturer producing (for example) a C3000 concrete product out of 10 plants within a 100 mile radius, generally employs different recipes for the same targeted performance since both the quality of the production process (in a specific plant) and the quality of the local materials may vary significantly. The manufacturer can then use one (or more) "averaged" or genericized basemixes 332 and convert them into actual production mixes 334 at each specific manufacturing facility (utilizing local materials). This conversion and amount-adjustment process is known as "instantiation" 333. Through instantiation, many local brand name mixes 334 may satisfy a single standard-based basemix code 332.

As with the materials processes 200, there may also be linked objects to a concrete verification step 338 to assure that the concrete meets the standards that it purports to meet. The concrete may preferably be applied (used), specified, and/or purchased 336 requiring a verification step. Also, at various points in the manufacturing process, there may also be verification. The arrows showing data linking and flow in the FIG. 8 chart show how all of these different areas may be linked to each other to make the present concrete system more useful.

Figure 9:
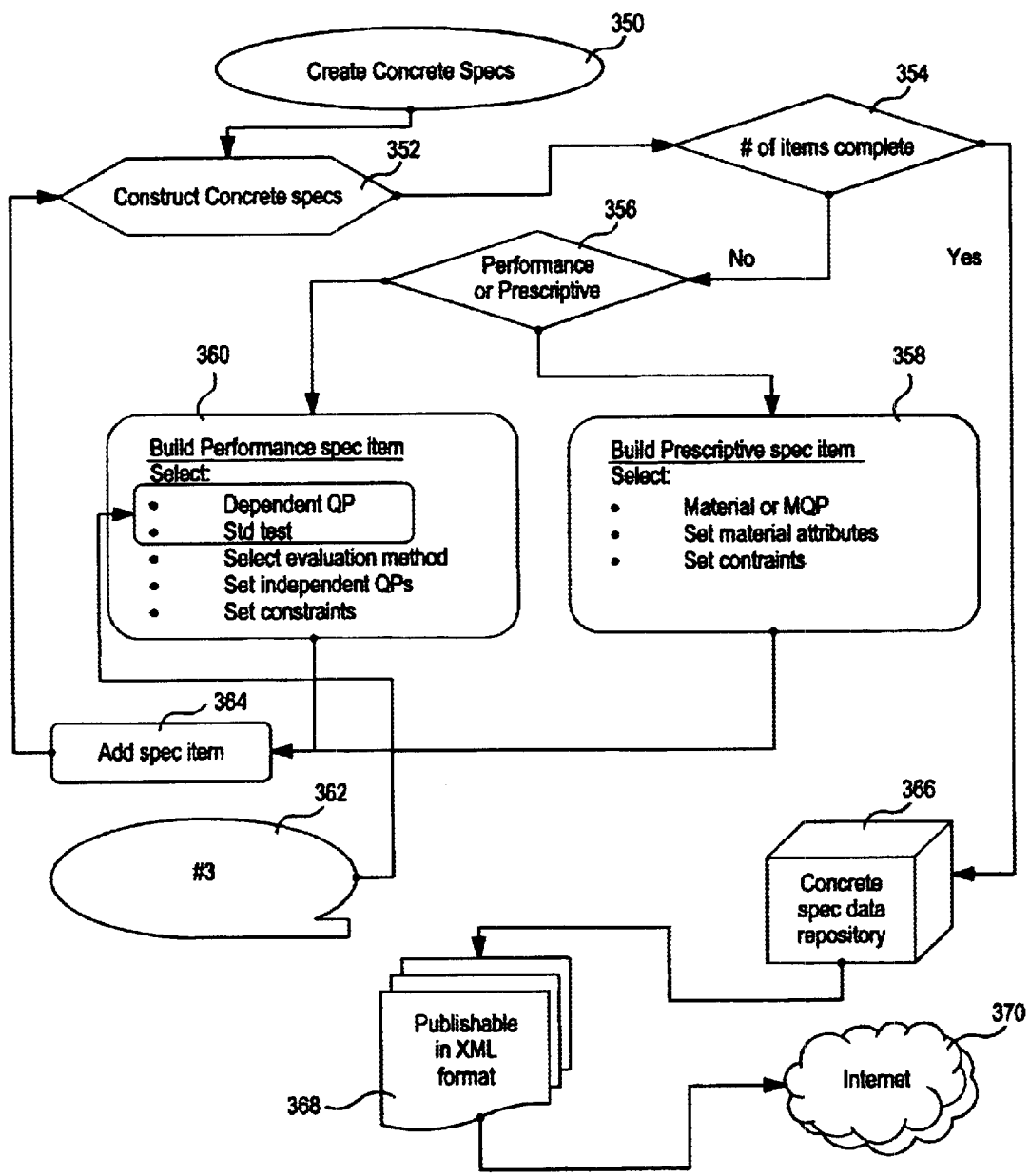
FIG. 9 is a flow chart of a process for creating concrete specifications.

As seen in FIG. 8, a large part of the concrete processes 320 of the present concrete system consists of creating concrete specifications for either the AEC 324, manufacturer-submitted 330, or manufacturer target 326 specifications. FIG. 9 shows a flow chart of one preferred process for creating concrete specifications as part of the present invention. The process begins 350 with the construction of a particular concrete specification 352 containing a number of items. If the number of completed (defined) 354 items is not equal to the total number items desired, then the specification of the concrete is incomplete and the additional items are preferably defined. This part of the flow chart will "loop" around until the appropriate number of specification items are defined.

A first decision in creating a specification item may be to decide whether the particular specification item to be created will be prescriptive or performance-based 356. As described above, a prescriptive specification item 358 preferably references specific materials and the materials attributes and/or constraints while a performance-based specification 360 lists the physical and chemical characteristics of the concrete after production. If a performance-based item 360 is defined, it will preferably consist of one or more quantifiable properties and standard tests, and may include a preset dependent variables and/or constraint of which the concrete must satisfy. The list of QPs and/or standard tests preferably comes from those database items (linked objects) as created with respect to FIG. 3 process 362.

If, on the other hand, the specification items are listed prescriptively 358, the item may preferably include the material or MQP (material quantifiable property such as water/cement ratio), a set of material attributes, and/or constraints in which the materials should fall (e.g., Type I cement with at least 500 lbs. of cement per cubic yard).

Once defined, either prescriptively 358 or performance-based 360, the specification item is preferably complete and is added 364 to the concrete specification being built. Again, the list of completed specification items are compared to the total number of items 354 that are to be defined for the current specification. If all of the items have not been completed, the next specification item should be defined. Each additional item can be either prescriptive or performance-based 356, and one concrete specification may contain a mix of both prescriptive and performance-based specification items.

If all of the items for a particular concrete specification have been properly defined and constrained, the specification is preferably stored in a concrete specification data repository 366. This repository 366 preferably resides on the concrete database as part of the concrete exchange system of the present invention. The contents of this repository 366 may then preferably be posted on the Internet 370 as part of the concrete system in XML 368 format or in some other web-based document publishing format. Examples of the creation of both performance specifications (e.g., slump as per C143 between 4" and 8" using one standard deviation evaluation method) and prescriptive specifications (e.g., water/cement ratio less than 0.45) are shown in FIG. 10.

Figure 11:
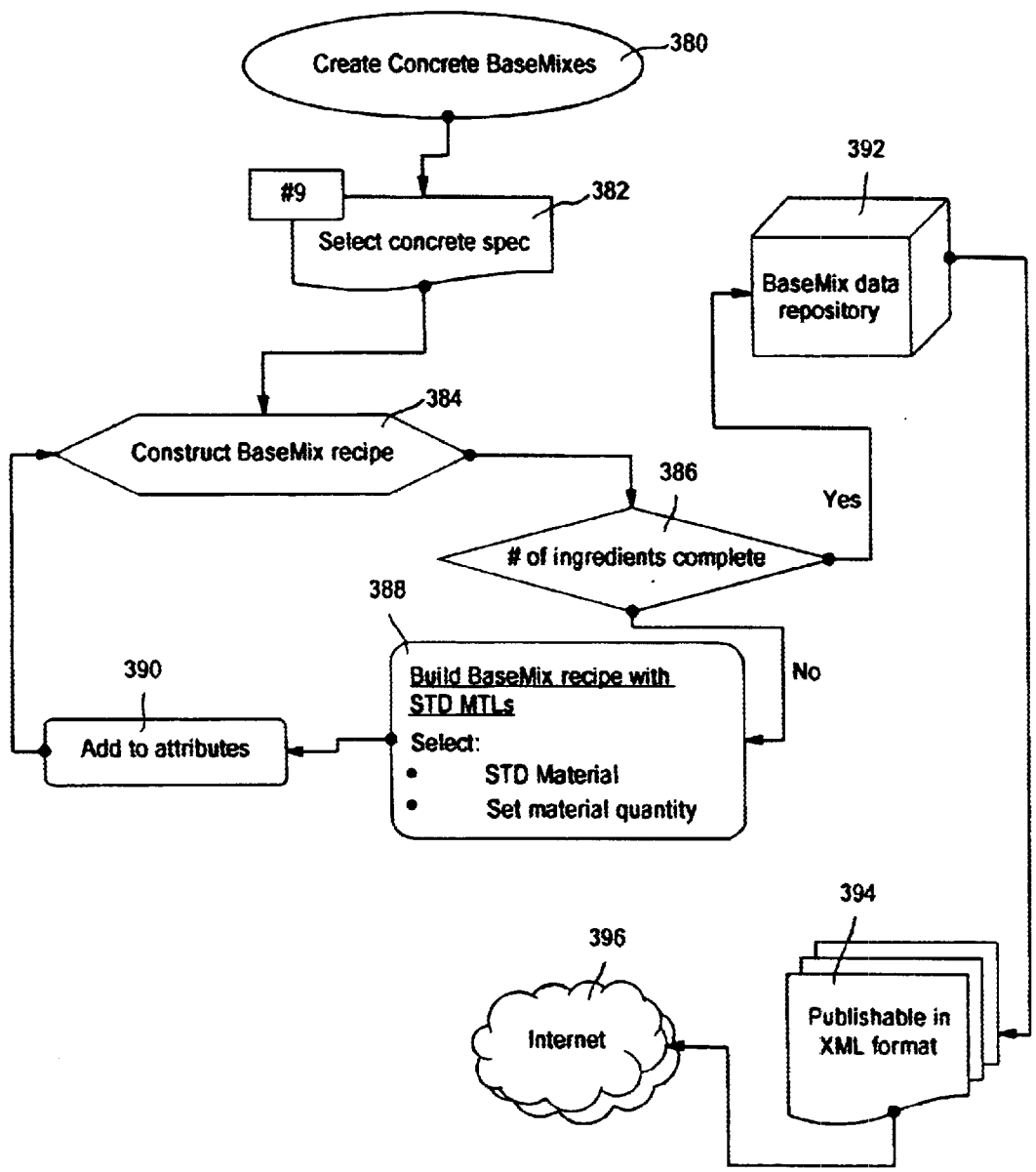
FIG. 11 is a flow chart of a process for creating concrete basemixes.

FIG. 11 details a flow chart for one preferred process for creating the basemixes 332 shown in FIG. 8. The basemix creation process begins 380 with selecting a concrete specification 382 for which to make a mix. This specification is preferably one that was generated in the process described above with respect to FIG. 9. The concrete specification 382 may be selected directly from a database of these FIG. 9 concrete specifications (concrete specification data repository). Each basemix recipe will be comprised of a number of ingredients that must be created or defined 384. If, at this stage, less than the total number of ingredients has been defined 386, then the recipe is incomplete and more ingredients must be defined.

To "build" the basemix recipe 388, quantities of standard materials must be made part of the recipe. Each standard material and quantity is a generalized form of representing the specific (brand name) materials and quantities of the given concrete specification, or is a generalized form of representing a performance-defined concrete specification item. These standard-based material recipes (basemixes) 388 can then be retranslated (instantiated 333) into various other brand name material recipes depending on where in the country or the world the particular concrete (conforming to the concrete specification) is required. This basemix process is a way of generalizing and rationalizing the many thousands of recipes that exist. An example of a basemix for concrete may include the standard materials: Type I cement at 550 lbs. per cubic yard of concrete, 1700 pcy of coarse aggregate ASTM Type 57, and 50 pcy of flyash Type C among other materials. These materials are all "generic" and are defined by the standards rather than being "real world" brand name materials.

Once a standard material type and quantity are defined 388, this item or ingredient is preferably added 390 to the basemix recipe. Once all of the basemix recipe ingredients or items have been defined 386, the recipe is preferably stored in a basemix data repository or database 392 (which may preferably reside on the concrete exchange system database. Then, the recipes are preferably published 394 over the Internet 396 in XML format or in some other web-based document publishing format. The basemix 332 may now be used as part of the concrete system of the present invention to denote a "generalized" or "average" recipe for a given concrete specification.

Figure 12:
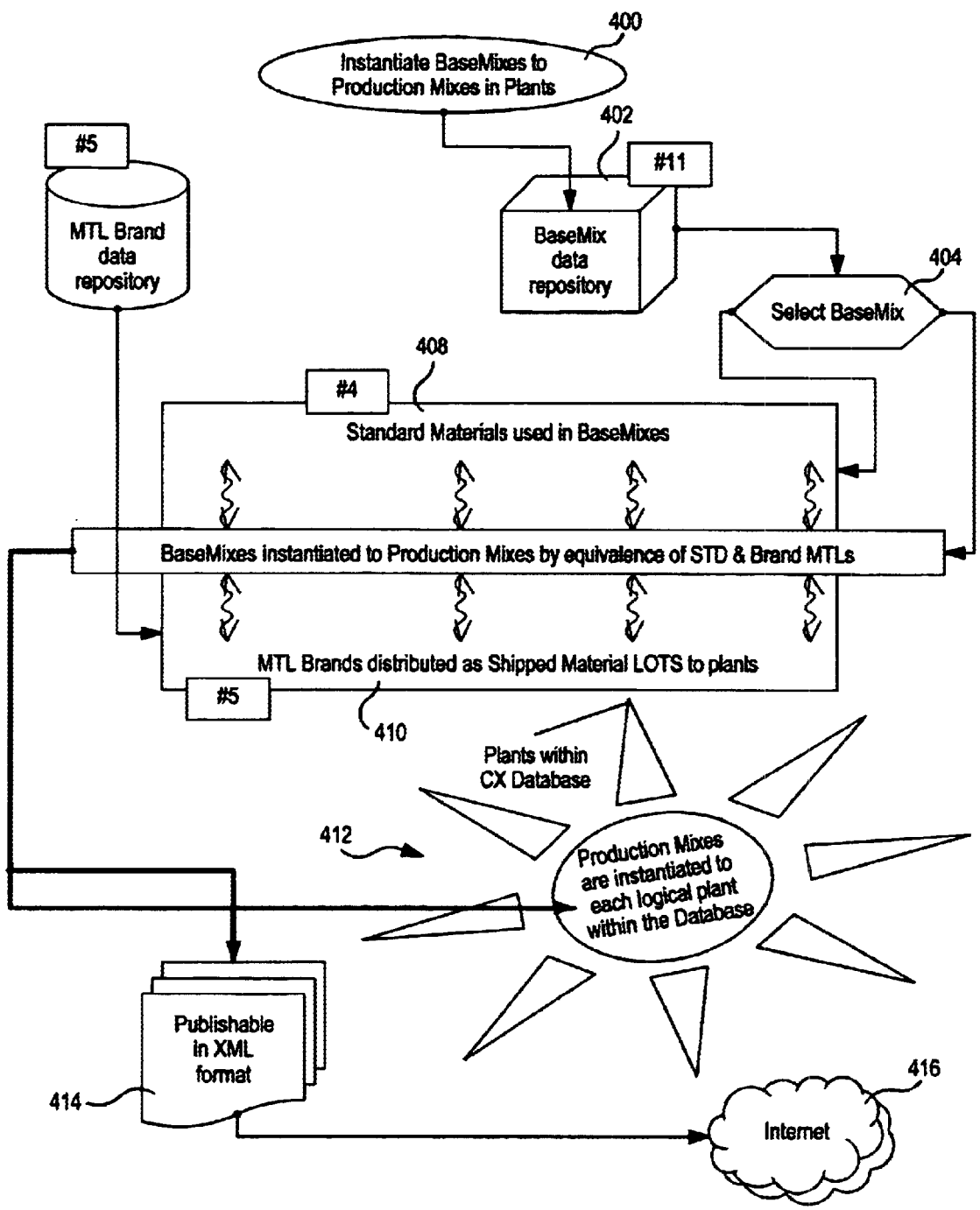
FIG. 12 is a flow chart of a process for instantiating concrete basemixes to production mixes in plants.

As stated above, one of the more useful applications of the basemix 332 concept may be the ability to convert (instantiate 333) one general basemix 332 into many local or area-specific production mixes 334 that specify actual brand name materials. FIG. 12 shows a flow chart of one preferred process for instantiating concrete basemixes to real-world production mixes in plants. The process begins 400 with locating one or more basemix data repositories 402 (created by the process in FIG. 11); one or more material brand name data repositories 410 (created by the process in FIG. 5) and one or more standard material specifications 408 (from FIG. 4). A specific basemix to be translated is preferably selected 404, and the concrete system makes the conversion (instantiation). Specifically, all of the items or ingredients of standard materials in the generalized basemix are instantiated to an equivalent brand name material 406 found in the material brand data repository.

The result of this process is a new recipe that is based on specific (brand name) materials that are located within a sufficient distance to a concrete manufacturing plant. These instantiated recipes can be "logically" provided or linked to each local manufacturing plant 412. Each local manufacturing plant within the concrete exchange database is represented by a "fin" on the star of FIG. 11 412. Upon instantiation, a local production recipe may be stored within this "fin" or logical database 412 within the concrete exchange. At the same time, the results of the instantiation procedure may be published 414 over the Internet 416 in XML format or some other web-based document publishing format. With this publication, all user of the exchange may see what recipes are used at what plant.

More specifically, the instantiation process occurs by way of an equivalence computational matrix. For example, to instantiate cement, the matrix would have one axis (for example the vertical axis) listing a series of binders (for example, ASTM Type I cements). Along the other axis (horizontal), there would be a list of several local or area-wide concrete production plants. Across, each horizontal row, the cement found in the first column (for example ASTM Type I Cement #1) is instantiated to each specific manufacturing plant. The entries in the matrix may preferably be percentages which represent the adjustment factors driven by the quality of each cement found at each plant and the operational quality of each plant.

For example, the amount of ASTM Type I Cement #1 called for in a basemix may be X amount. At plant #1 (according to the equivalence computational matrix), this cement amount may need to be adjusted up by a factor of 1% because the cement is of a lesser binding quality than the standard ASTM cement. At plant #2, the amount may need to be lowered by 2% because the plant #2 cement is of a higher quality than the ASTM standard. Through the use of this matrix, the concrete system of the present invention may be able to automatically compute the correct amounts of each material (ingredient) of a basemix concrete recipe needed if the concrete is produced at any given plant that is part of the concrete system. The actual adjustment percentages found in the computational matrix may preferably be either user-defined or may be derived using various modeling methods including data mining.

Figure 13:
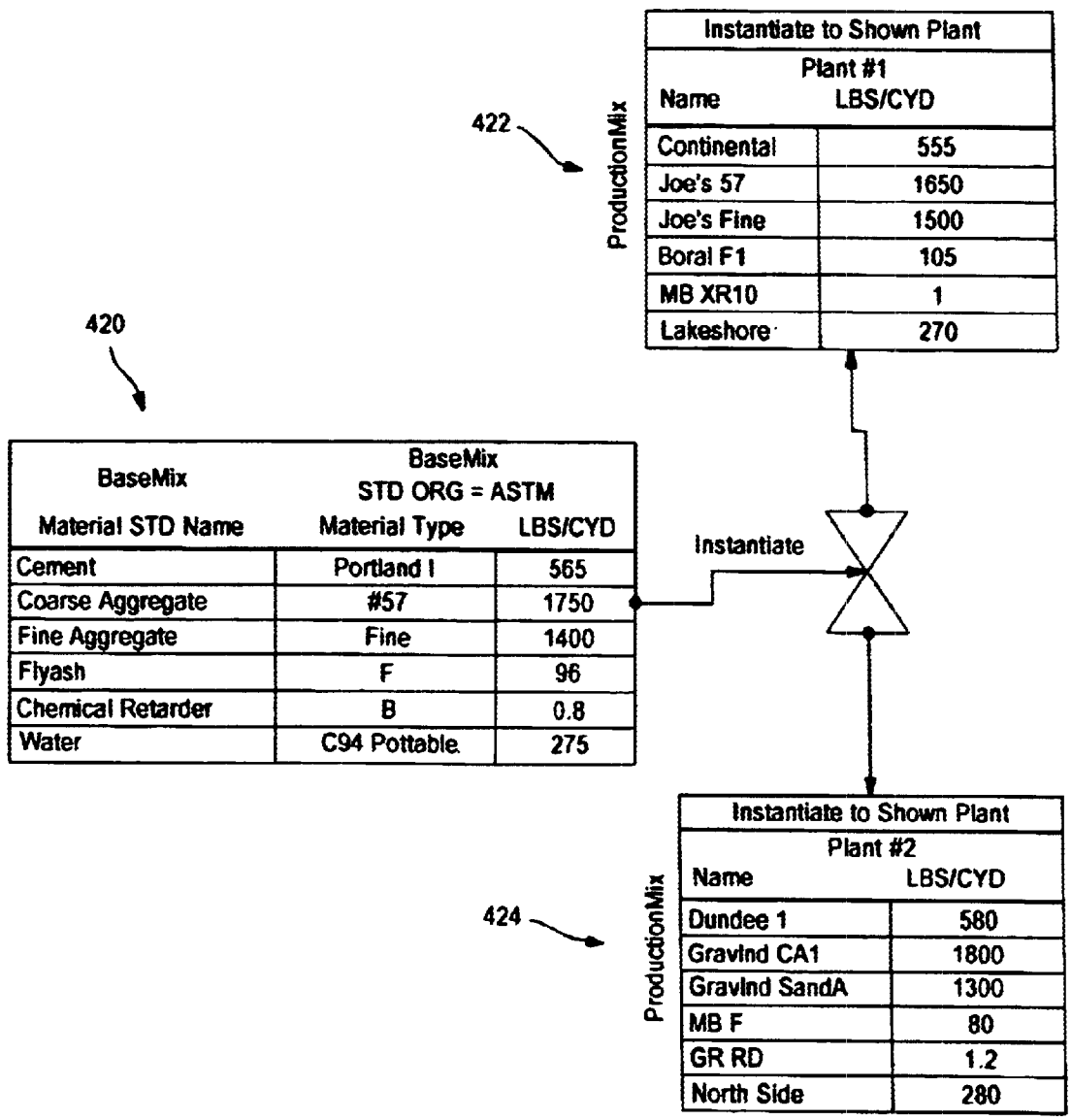
FIG. 13 is a sample of an instantiating procedure for two production mixes.

FIG. 13 shows an example of how a basemix is instantiated into production mixes found at two actual plants. In FIG. 13, the constituent materials that make up the concrete basemix 420 are all ASTM standard materials. They are not necessarily real world materials. These standard materials are then converted (instantiated) into real world production mix materials 422, 424 and the amounts are adjusted to compensate for the change. For example, the 560 lbs. per cubic yard of Portland Type I cement of the basemix 420 has been instantiated into 555 lbs. per cubic yard of Continental cement at plant #1 422 and 580 lbs. per cubic yard of Dundee I cement at plant #2 424. The varying amounts for the different cements take into account the properties of these cements and any local/geographic conditions that affect plant production quality.

By using the above recipe converter as part of an online cement commodity exchange, the process of defining either a general recipe (basemix) or a recipe comprised of local materials (production mix) may preferably be streamlined. This process may be useful to anyone who is interested in converting general concrete standards to specific materials, but may be especially useful to a contractor or other entity that wishes to port a known local cement recipe to another city or geographic area (i.e., generalize the local production mix to a generic basemix and then instantiate the basemix to a second production mix in the new locality).

It is also very useful to a concrete manufacturer who is manufacturing and shipping concrete from multiple metropolitan, statewide, or worldwide locations. This manufacturer may need to establish uniform product codes regardless of local mixture recipes in order to have a standardized interface for its product offerings to its customers and vendors or because the manufacturer wishes to benchmark its operations in terms of the best practices. A manufacturer may also need to integrate its mix management information system with its other ERP systems such as sales and financial systems. Because cement is preferably mixed close to the construction site using local materials, such an automated system may be preferable to conventional methods. Although this recipe converter (basemix) was described with respect to different United States cities, it is equally applicable throughout the world, particularly in regard to establishing uniform worldwide concrete product codes. As the recipe converter database expands, so to should its usefulness.

The above discussion details much of the concrete processes associated with the present online concrete exchange. The following discussion will describe how all of the different above-described parts fit together (i.e., system integration). Specifically, there more than 15,000 batch plants or manufacturing plants for concrete within the U.S. Many of these plants run proprietary computer systems that may not be able communicate with each other. Many of these plants presently communicate with each other by telephone and fax links. The present invention, in at least one presently preferred embodiment, may link all of the existing plants that have some type of communications or Internet access to each other by translating relevant information into data objects and subsequently communicating or sharing this information to the world through some general publishing format (such as XML).

Figure 14:
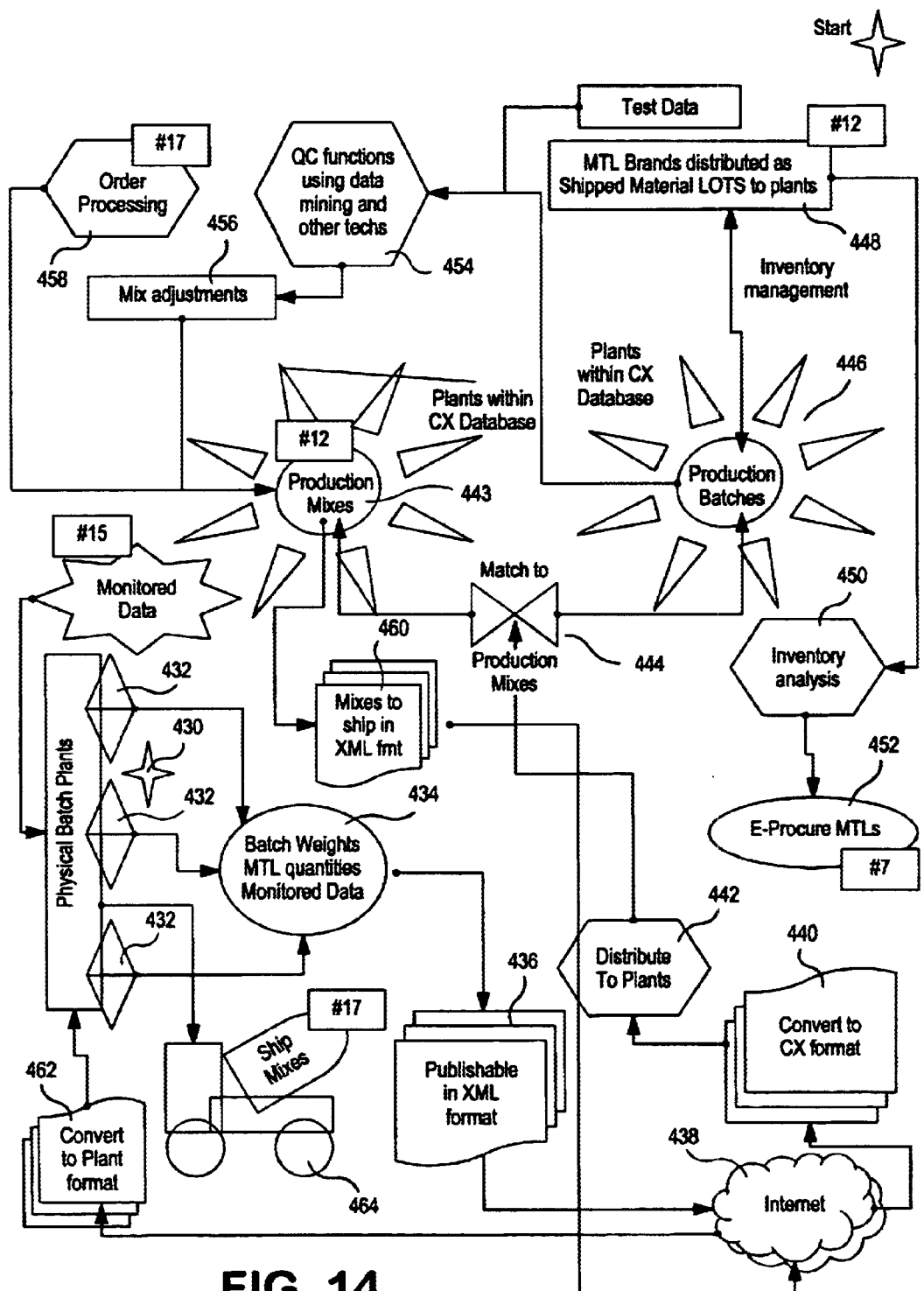
FIG. 14 is a flow chart for a systems integration process.

FIG. 14 shows a top level flow chart of system integration for various batch (manufacturing) plants. The process begins 430 in the three physical batch plants 432 which weigh the quantities of materials used in the concrete. These plants may preferably weigh quantities approximately every three minutes and then mix the batches for only approximately 30 seconds. The mixing process is very fast, and updated ("real-time") information about a plants current batches and inventory may be useful.

The information collected at this point may be useful to the plant manufacturers. The information includes not only what the particular batch was supposed to be made of, but also what the batch actually is made up 434. For instance, the recipe may have called for a 3000 psi mix with 500 lbs. of cement. The sensors may determine that the actual quantity of cement may have been 520 lbs. In this mixture. This information 434 may be useful both to update the recipe for that particular plant and to track the inventory of materials at that plant.

The information about the current batches may be published 436 over the Internet 438 in XML format. This information in XML format 436 may then arrive at the concrete exchange databases and be converted 440 into a data format that can be used by the concrete exchange. This converted information is then sent to the concrete exchange logical databases that represent the physical plant 442 where the information came from. The actual amount of materials may be matched 444 to a production mix (concrete recipe) 443 and logged in the logical plants within the concrete exchange database. On the other side of the flow chart, the actual amount of concrete that was physically mixed together (the production batch) 446 is also sent to a logical representation of the particular batch plant that created the mix.

This "actual batch" information may be used as part of an inventory analysis of the batch plant. First, the amount of brand name materials 448 that was actually sent out could be analyzed by the concrete exchange database and an inventory analysis 450 may be performed (see FIG. 12). If a certain amount of a material has been used (and supplies are getting low), the system may use its own e-procurement functionality 452 (see FIG. 7) to replenish the supply of materials for that particular plant.

This production batch information 446 is also preferably sent to a quality control function 454 to determine how well the plant is producing concrete compared to the idealized recipe. More specifically, the quality control functions may include data mining technologies to discover relationships which have economic value. For example, if a plant is consistently providing concrete that contains too much of one material or that has some unwanted attribute that can be corrected, these data mining techniques can be used to discover those problems and correct the production mix recipe via a mix adjustment function 456. To adjust the mix 456, these quality control functions may preferably be logically connected to the production mixes 443 stored in each of the logical batch plants located within the concrete exchange database.

An order processing function 458 may also be connected to these stored logical production mixes 443 to determine what the next batch of concrete to be produced in the batch plant should be. The new orders or any information about the old orders that have not shipped yet may preferably be published 460 over the Internet 438 in XML format. At the intended production batch plant, these new orders are preferably converted 462 back to a computer format that the batch plant's computers can understand, and the shipping/mixing instructions for the next batch of concrete may preferably be loaded into the mixing machines at the batch plant. The concrete to be shipped may then be loaded on concrete mix trucks 464 and shipped to the end user.

Figure 15:
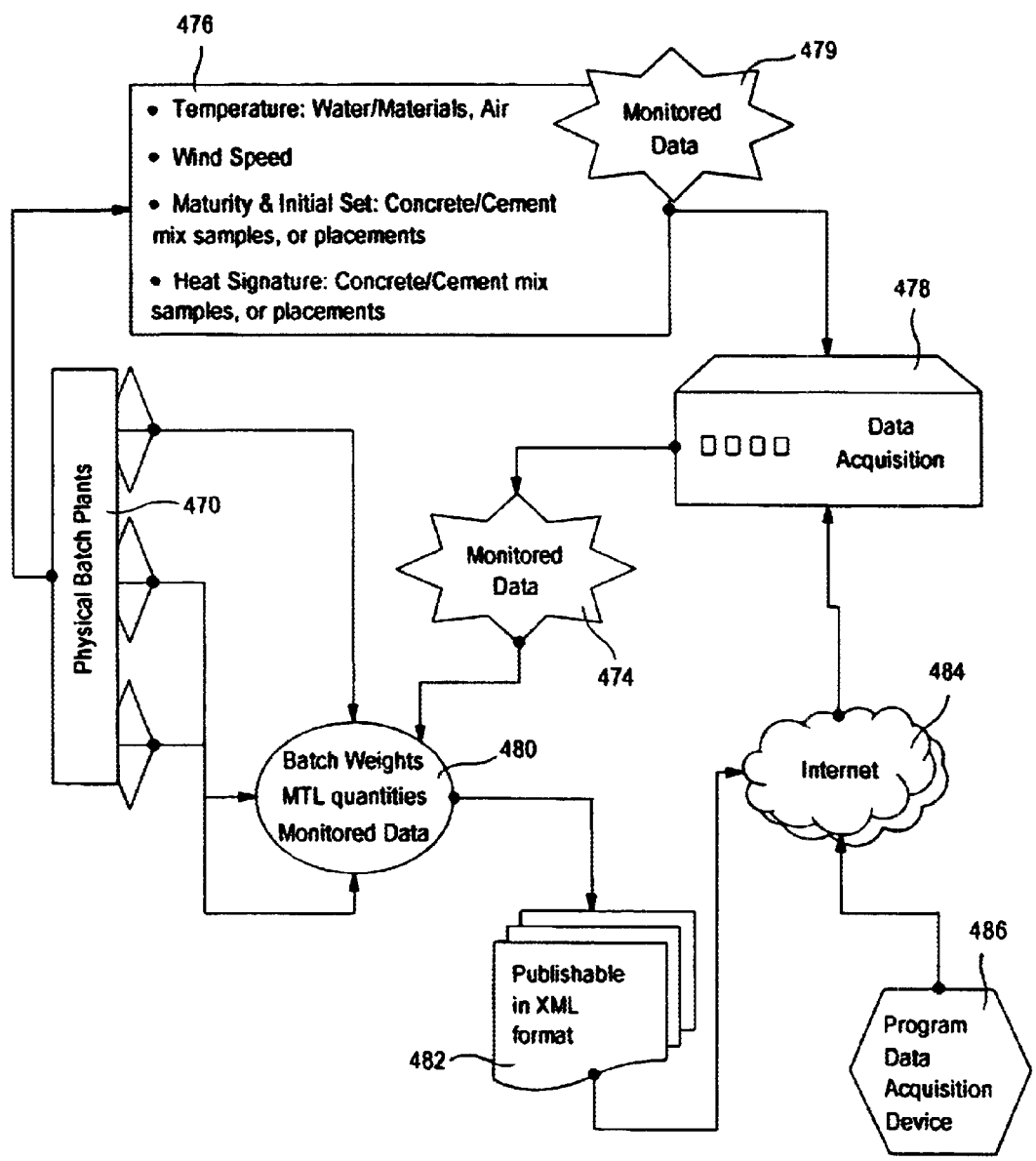
FIG. 15 is flow chart for a dynamically monitored data process.

FIG. 15 details a flow chart for a dynamically monitored data process for system integration of the concrete exchange system. The physical batch plants 470 again collect various information 476 about the different batches of concrete produced. The batch plant may monitor and store this data 474, wherein the monitored data may include the temperature of water, concrete materials, and the air; the wind speed; the maturity and initial set characteristics of the concrete/cement mix samples or placements; and/or the heat signature of the concrete/cement mix samples or placements 476. This monitored data may preferably be connected to a data acquisition device 478 that logs and stores the collected data. This monitored data is then preferably sent to a collection device 480 at the physical batch plants.

The collected data 480 at the physical batch plant, which includes the batch weight data, the material quantities, and/or the monitored data from the data acquisition device. This information may be published 482 over the Internet 484 in XML format. This published data may then preferably be downloaded into the data acquisition device for further analysis, collection or storage 486. Alternatively, program data could also be sent from an external source over the Internet to the data acquisition device for collection, storage, or to be transmitted to the physical batch plants. These data monitors can be controlled from anywhere over the Internet from a program block.

Figure 16:
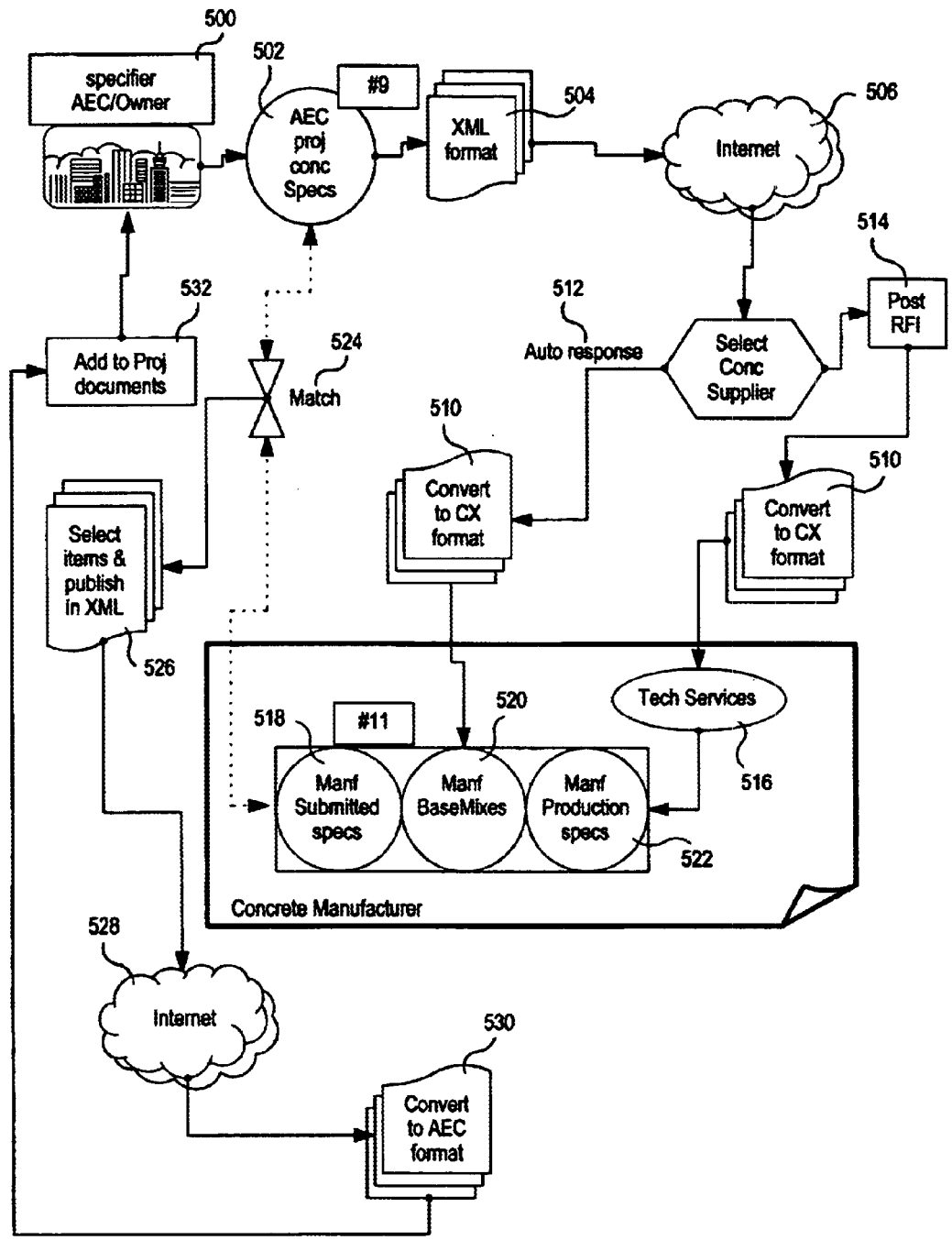
FIG. 16 is a flow chart for engineering specification of manufacturer's products.

FIG. 16 shows an embodiment of a process for an engineering specifier specifying a particular concrete manufacturer's products. This may be useful for a project engineer located in one geographic location who wishes to locate a concrete supplier for a project in another geographic location. The AEC specifier begins 500 by drafting a set of concrete specifications 502 for a particular job. Although the entire construction project includes many different subsets of materials, we deal here only with concrete. These concrete specifications 502 may be in written or electronic form. They may include the thickness of the concrete walls or foundation as well as any other concrete-based criteria as discussed with respect to FIG. 9.

The AEC then converts these concrete specifications into XML format 504, or some other web-publishable format, and publishes them on the Internet 506. The AEC then selects a concrete supplier 508 based on these specifications and the geographic location of where the concrete is needed. The specifications are then converted into a concrete exchange format 510 that can be interpreted by the concrete exchange system. This conversion and manufacturer selection may take place in one of at least two different ways. First, the concrete exchange may include an auto response feature 512. With auto response 512, the AEC is a member of the concrete exchange system and, after logging into the system, the AEC is free to utilize the concrete exchange system to locate the necessary suppliers for his concrete on his own. The exchange acts as a conduit for the AEC's selection.

Alternatively, the AEC may post a request for information (RFI) 514 that is then converted into a concrete exchange-based format 510. Then, a sales or technical services representative 516 from the target (prospective concrete manufacturer) company will preferably contact the AEC to discuss the project. In either the above two ways, the concrete exchange system will help match an AEC with certain concrete specifications to a manufacturer.

After this, the specifications will preferably be compared to data repositories including manufacturer submitted specifications 518, manufacturer basemixes (generic) 520, and/or manufacturer production mixes (actual) 522. These data repositories 518, 520, 522 may have been made according to the process depicted in FIG. 11. These databases 518, 520, 522 describe the concrete mixes and recipes that a particular manufacturer is capable of providing. The specifications (from the AEC) and the manufacturer's capabilities are then matched 524 to determine which manufacturer mixes and brands satisfy the AEC's project needs.

The proper manufacturer items are then preferably selected and published 526 in XML or some other Internet-publishable 528 format. They may be transferred back the AEC over the Internet 528 and converted back into an AEC-based format. This document can then be added 532 to the AEC's project documents.

Figure 17:
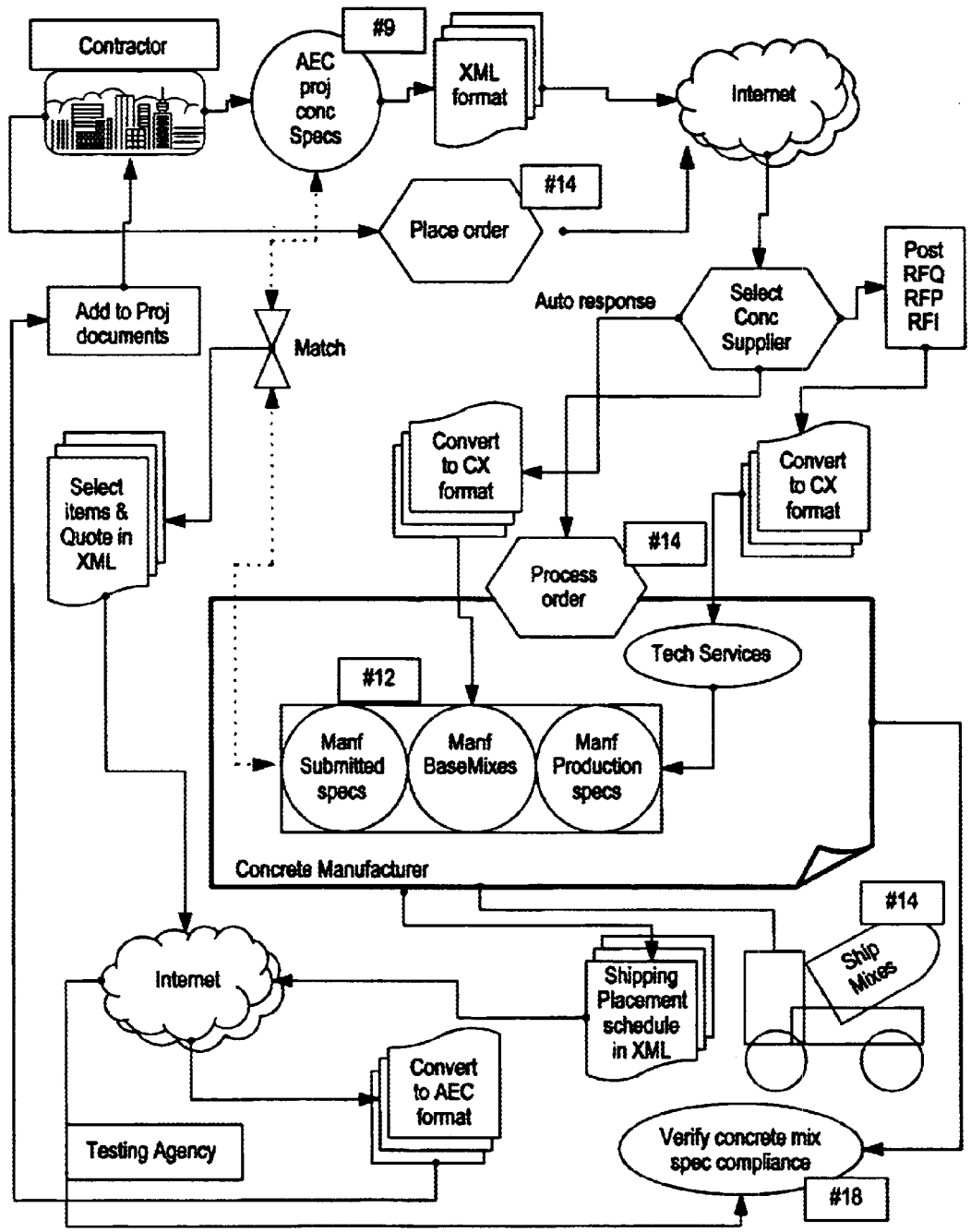
FIG. 17 is a flow chart for a contractor purchasing a concrete manufacturer's products.

FIG. 17 shows one embodiment of a process for a contractor purchasing a particular concrete manufacturer's products. This is very similar to the engineering specifier process described above. The FIG. 16 process is useful for an architect or engineer to specify products (preferably a couple of years before the project begins) whereas the present figure (FIG. 17). Describes the actual purchase of particular materials by the contractor at the time that the concrete is needed at the site.

Figure 18:
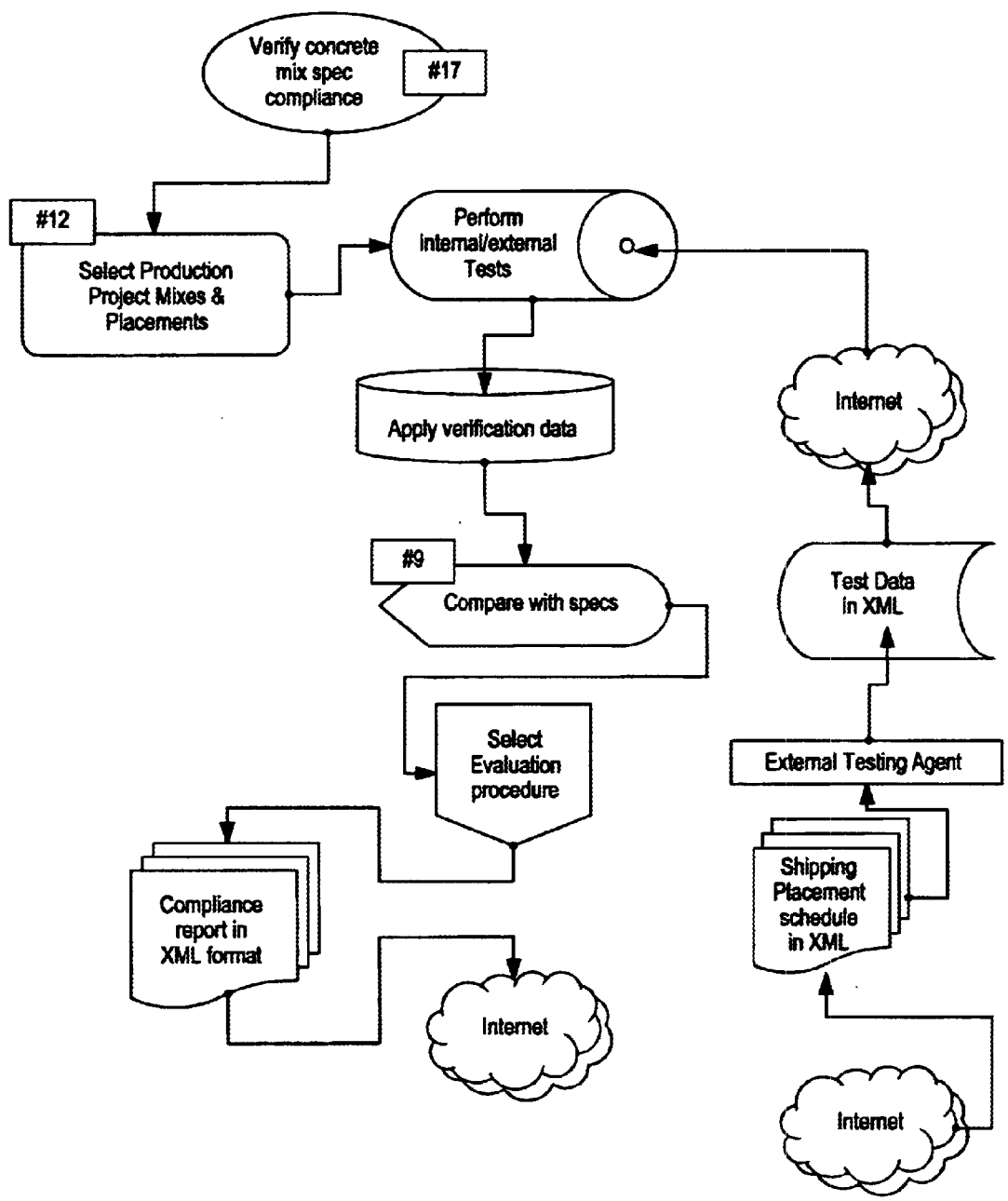
FIG. 18 is flow chart for a concrete mix verification process.

FIG. 18 details a top level flow chart of a process for verifying specification compliance for a selected material brand. This verification process is substantially the same as the verification process for the concrete constituent materials (FIG. 6). The tests can be performed either internally or externally by a third party testing agent. The test verification data are then applied to the collected internal or external test data and are compared to the specifications (from FIG. 9). The results are then preferably published in a compliance report and preferably published in XML language over the World Wide Web.

Figure 19:
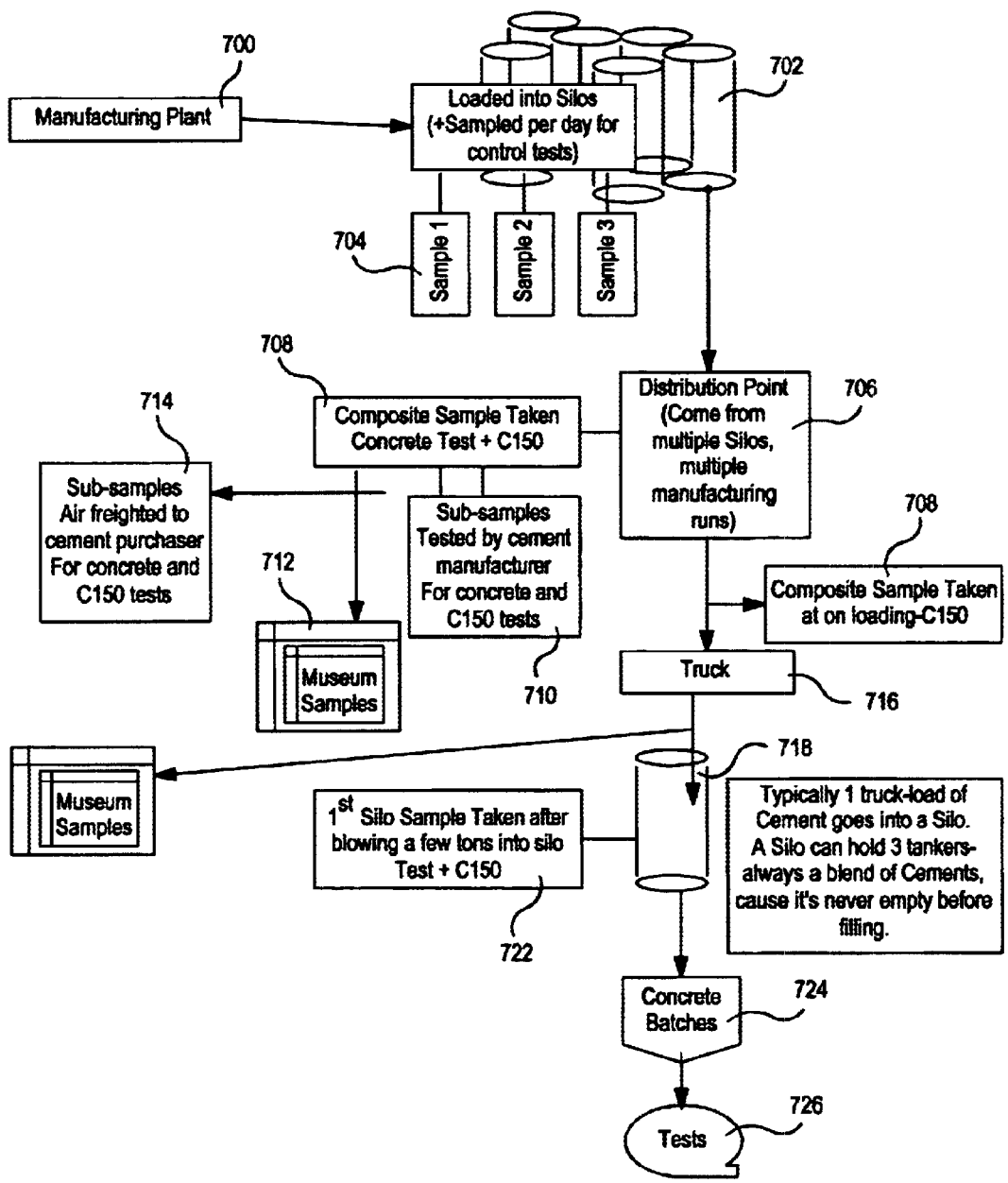
FIG. 19 is a flow chart for a locally manufactured cement material process.
Figure 20:
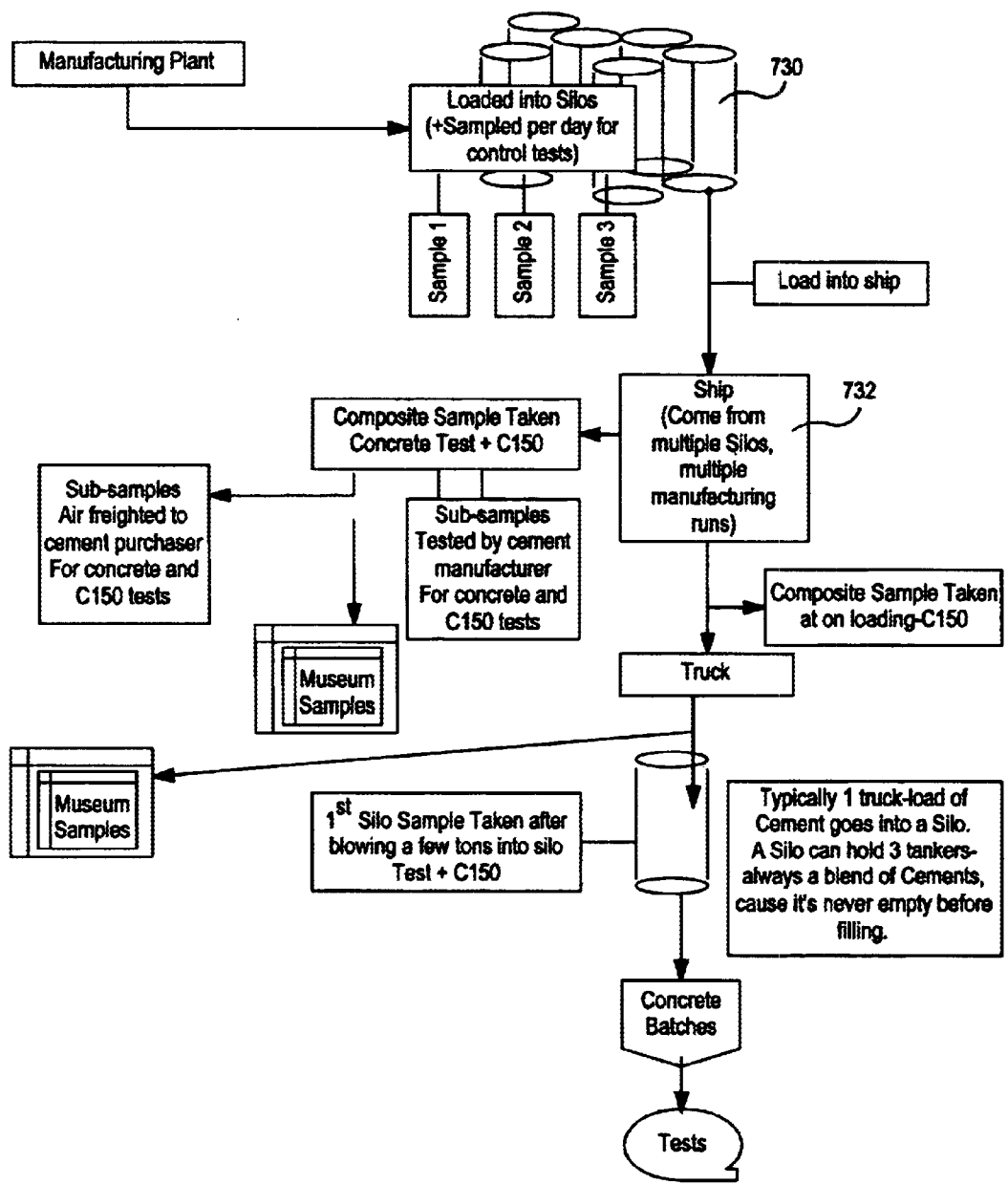
FIG. 20 is a flow chart for an imported cement material process.

FIG. 19 details the flow of materials and sample acquisition from a local material manufacturer. FIG. 20 details the flow of materials and sample acquisition for imported materials. In FIG. 19, a materials manufacturing plant 700 loads one or more different types of cement or other materials into silos 702 for temporary storage. Samples 704 are taken on at least a daily basis while stored. The cement is then taken to a distribution point 706 where cement from different silos is mixed together for different manufacturing runs. At this point, one or more composite samples 708 are taken. Some of these samples 708 may be tested 710 by a manufacturer for concrete and C150 tests. Some other of these samples may be stored for future use as a museum 712 sample. This museum sample may be useful in the future—when a poured batch of concrete fails, the concrete can be traced back to a batch of cement. A museum sample of this cement, if available, can then be tested to determine possible causes of the failure. Some other samples may be sent directly to the cement purchaser 714 so the purchaser can commence tests on the cement.

From the distribution point, the cement is preferably taken by tanker truck 716 to another silo 718 near the concrete batch manufacturing plant. Here, another sample may be taken 722, or a daily sample may be taken during storage in the silo. Eventually, the cement will be used in a concrete batch 724 and tested as such 726.

FIG. 20 is substantially the same process with the exception that the cement comes from a greater distance. Here, huge amounts of cement are taken from the manufacturer silos 730 and loaded onto a ship 732 to be transported a significant distance. Various samples are again taken, and the cement is shipped to local batching plants via truck. Again, some samples are immediately tested for specification compliance, while others are stored as museum samples for the future. The present concrete exchange system may facilitate this process by allowing the cataloging of the immediate tests as well as the location of museum samples for all concrete projects on the Internet. In this way, an AEC or other entity can locate cement samples from a great distance more easily than by conventional methods.

The previous discussions have described both the creation and cross-referencing of various standard and user defined materials and concrete recipes. It has also tied these two processes together to show examples of how various material's providers, batch plants, concrete specifiers, and verification entities may interact over the web-based concrete business to business exchange to take advantage of the powerful relational database structure of the present invention. For purposes of clarity, a few additional features and details about the relational database will now be provided.

Figure 21:
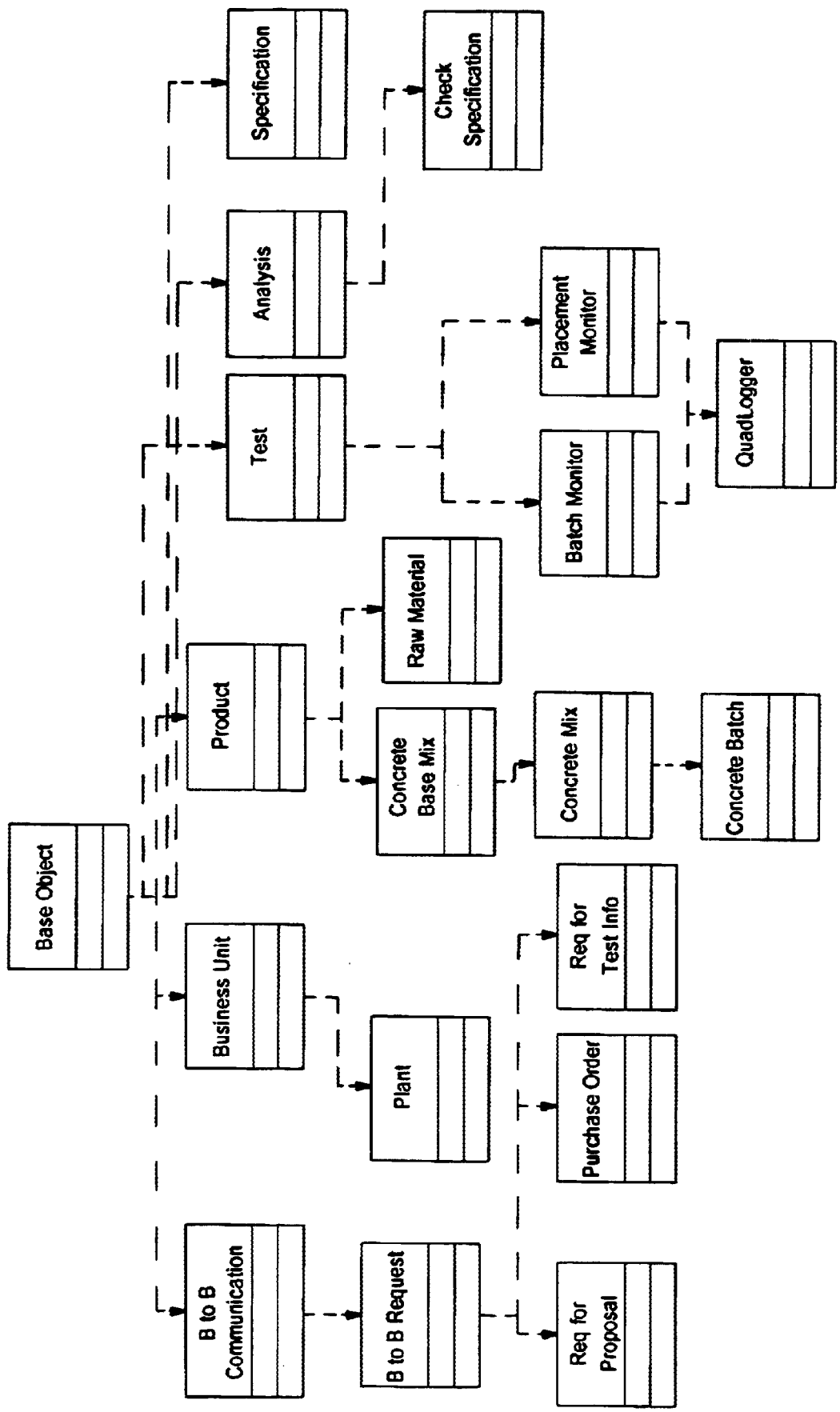
FIG. 21 details sample database data objects.

In building concrete exchange system, many software objects are created with a long and varied subclass hierarchy of software objects. The state of various objects is preferably maintained within a database. One possible design for parts of a database supporting the above objects is illustrated in FIG. 21.

Figure 22:
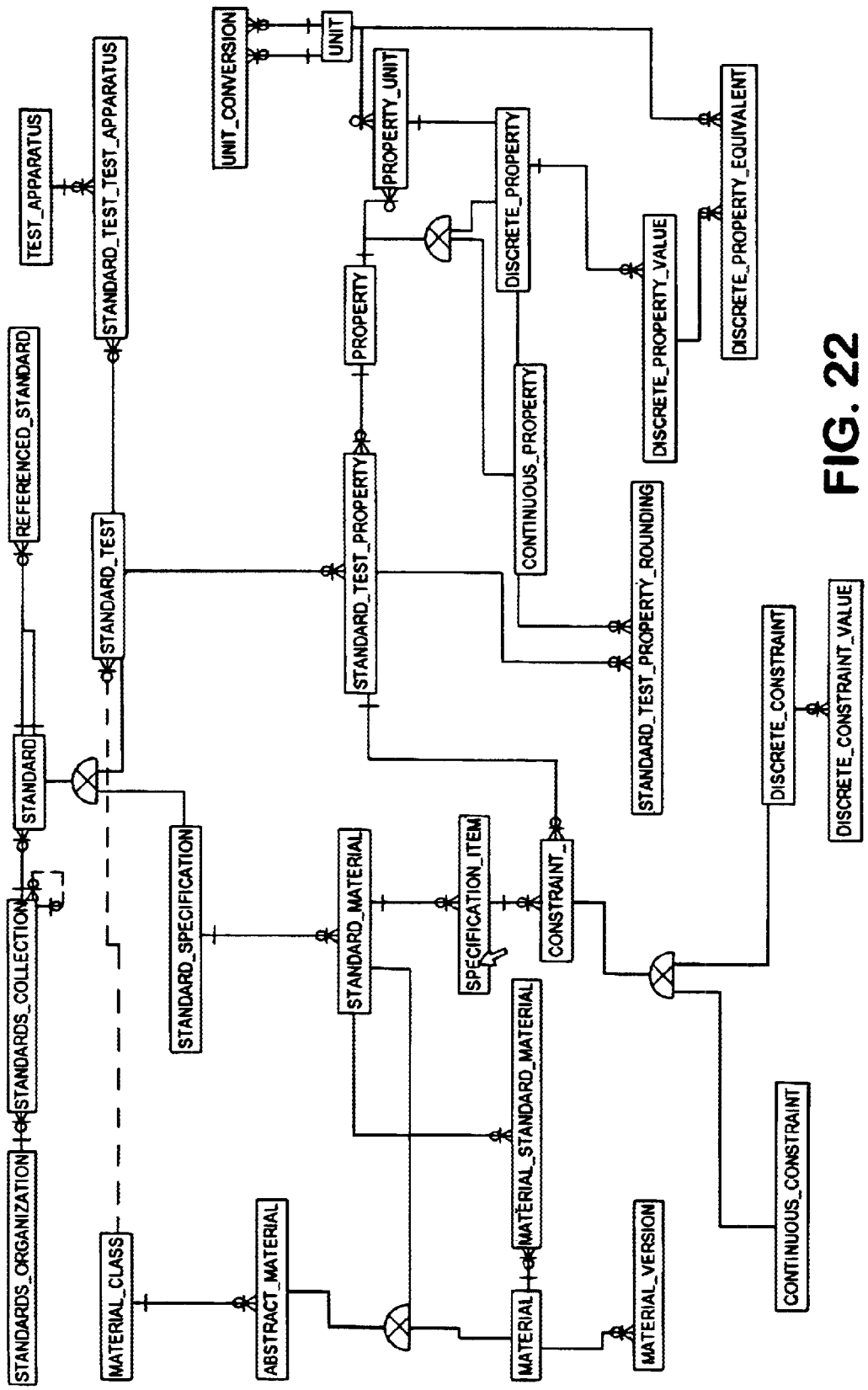
FIG. 22 is a sample database program flow for standards.

As an example of database structure and program flow, the design for the Standards Maintenance portion of the database is shown in FIG. 22. The standards collection entity is preferably recursive; the volumes of a standards organization such as ASTM has a tree structure where sections and volumes may be subsections of other sections.

A standard maybe one of two types: a standard test or a standard specification for a set of standard materials. For example a standard might define how a slump test is to be done, or a standard might define requirements that must be met by different types of Portland cement.

An abstract material may be one of two types: an actual material (i.e., brand name such as Dundee cement) or a standard material (i.e., type I Portland cement).

Figure 23:
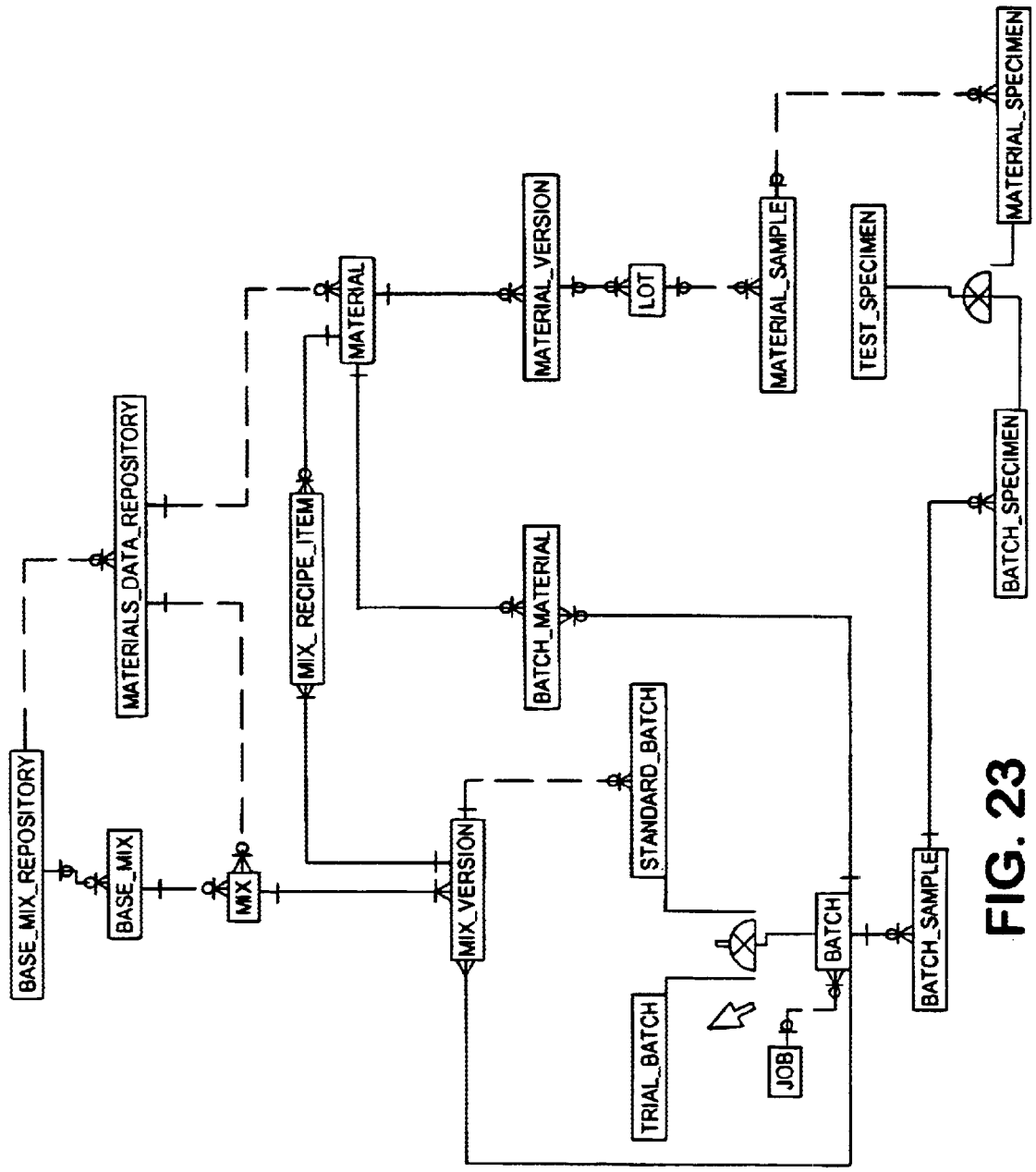
FIG. 23 is a sample database program flow for basemixes.

A standard material must preferably obey several Specification Item requirements. Each Specification Item contains one or more Constraints on measurable quantities. A constraint may be one of two types: a constraint on a continuous variable or a constraint on a discrete variable. A property or measurable quantity may by one of two types: a continuous property or a discrete property As a further example, a design for the mix, batch and materials part of the database is shown in FIG. 23. A batch may preferably be one of two types: a standard batch which is a child of a mix version or a trial batch which has no parent mix.

A test specimen may be one of two types: a batch specimen of concrete or a material specimen of any of the other material types that the system handles. A mix has a recipe in terms of material brands (such as Dundee cement and Acme Rock); a many to many relationship with material.

A materials data repository is a place where material is stored and used. Typically this would be a batch plant which contains lots of each of the materials that it uses. A similar many to many relationship between basemix and standard material is not shown since standard material is not on this picture.

The relationship for the materials in a batch might be connected to a specific lot of a material.

There are several other features optionally included in the present invention which may provide for a more complete specification and procurement process. For example, the on-line concrete exchange will also preferably have some type of interactive map service or geographic capabilities. For example, this map service may be capable of planning truck travel paths, estimate driving times, draw radii on the maps and limit the provision of materials and batches to those entities that geographically qualify.

The system preferably is capable of locating various entities (e.g., batch plants, labs, materials manufacturing plants, materials distribution terminals, construction sites, and proposed construction sites) on the map. For example, the address of these entities may be provided to the system (or a third party system hosting the interactive map capabilities), the system may allow a user to select and view various entities on an interactive map. Preferably, the user may zoom and locate applicable suppliers.

Because some construction sites extend for hundreds of miles, the interactive map, and the concrete exchange system as a whole are preferably capable of locating geographically compatible entities from a strip or area as well as from a point. In other words, materials from different source entities may be used at different parts of the construction site. The various entities may be viewed on the interactive map at various levels of zooming.

There may also be a mix request blackboard or similar structure for making and satisfying materials and concrete requests. For example, a user may send an XML file for a service request to have a mix with specifications that it hardens within 5 hours with a slump of 3 inches and the mix can generate any amount of heat at all. This is request may be posted on a mix request blackboard.

Thereafter, a concrete manufacturer preferably sees the request on the board and searches its own catalog of materials and/or concrete mixes and proposes a near fit to the specifications. The concrete manufacturer may then send an XML file of the mix to a bid blackboard. Another service provider, a concrete lab, preferably posts an XML file of a bid to develop such a mix based on a close fit and a plan to use various accelerator chemical amounts to optimize the mix. The original requester decides on the bid from the laboratory and sends an authorization for work to the lab.

In order to facilitate the achievement of the above economic and engineering goals, concrete exchange uniquely allows for the needed testing simulation, and optimization processes via the Internet. The system may allow a user to ask for a simulation over the site, Send the mix and slab geometry and curing history as XML files and return the results of the simulation as an XML file. Also the system may allow the user to generate simulation using the Quadrel interface and a library of AHS's for existing mixes.

Also, the cement exchange system of the present invention could be extended to cover different construction or other materials selling processes within the scope of the present invention. This extension may encompass construction materials in general, their use and engineering in construction, and the equipment needed to manufacture and apply the materials. Some of the applicable materials may include: asphalt and road paving equipment; blocks; stone; bricks; dry wall; glass; fireproofing materials and systems; and various other manufacturing and processing equipment.

Although the invention has been described above in terms of particular embodiments, one of ordinary skill in the art, in light of the teachings herein, can generate additional embodiments and modifications without departing from the spirit of, or exceeding the scope of, the claimed invention. Accordingly, it is to be understood that the drawings and the descriptions herein are proffered by way of example only to facilitate comprehension of the invention and should not be construed to limit the scope thereof.

What is claimed is:

1. A method of electronically specifying a construction item made up of constituent elements, comprising the steps of:

receiving a manufacturer-submitted specification for said construction item made up of constituent elements;

determining a number of constituent elements needed to specify said construction item;

storing information related to a first constituent element as a database object;

storing additional information related to additional constituent elements until the number of constituent elements matches the number of elements in said determining step;

instantiating each of said constituent elements based on said manufacturer-submitted specification to a real-world material available at a desired location; and publishing each of said real-world materials as a complete production recipe of real-world materials to said desired location.

2. The method of claim 1, wherein said publication takes place over the Internet.

3. The method of claim 1, wherein said construction item is a concrete recipe.

4. The method of claim 1, wherein said first constituent element comprises a first quantifiable property.

5. The method of claim 4, wherein said first quantifiable property is stored in said database as a discrete value.

6. The method of claim 4, wherein said first quantifiable property is stored in said database as a continuous value.

7. The method of claim 4, wherein said first quantifiable property is stored in said database as dependent on another quantifiable property in the database.

8. The method of claim 4, wherein said first quantifiable property is stored in said database as independent of other quantifiable properties in the database.

9. The method of claim 4, further comprising the steps of:

creating a material specification by selecting appropriate database objects describing said material specification; and publishing said material specification over the Internet in XML format.

10. The method of claim 9, wherein said material specification is based on industry standards.

11. The method of claim 9, wherein said material specification is based on manufacturer specifications.

12. The method of claim 10, further comprising the steps of:

creating a material brand name based on industry defined product specifications; and storing said brand name in a brand name data depository; and publishing said brand name in XML format over the Internet.

13. The method of claim 9 further comprising the steps of:
verifying standards compliance for each material specification; and
publishing a compliance report over the Internet in XML format.

14. The method of claim 3, wherein said manufacturer-submitted specification is performance-based, specifying functionality for said concrete recipe.

15. The method of claim 3, wherein said manufacturer-submitted specification is prescriptive, specifying a recipe of standard constituent materials.

16. A method for specifying a concrete recipe, comprising the steps of:
receiving a specified concrete recipe based on intended performance criteria for said concrete;
instantiating said performance-based concrete recipe into a standard material-based recipe that satisfies the intended performance criteria;
receiving an identification of a location at which the concrete is to be used; and
instantiating the standard material-based recipe into a recipe of actual materials available at a mixing plant near the identified location.

17. The method of claim 16, further comprising the step of:
instantiating the standard material-based recipe into additional recipes of actual materials available at additional mixing plants at additional locations.

18. The method of claim 14, further comprising the step of:
communicating the actual material recipe to the mixing plant via an electronic communication medium.

* * * * *